(12) United States Patent
Yamamoto et al.

(10) Patent No.: US 8,418,016 B2
(45) Date of Patent: Apr. 9, 2013

(54) COMMUNICATION SYSTEM, COMMUNICATION DEVICE, AND COMMUNICATION METHOD

(75) Inventors: Kazunori Yamamoto, Yokohama (JP); Hideharu Suzuki, Yokohama (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 12/444,386

(22) PCT Filed: Oct. 5, 2007

(86) PCT No.: PCT/JP2007/069607
§ 371 (c)(1),
(2), (4) Date: Apr. 3, 2009

(87) PCT Pub. No.: WO2008/044653
PCT Pub. Date: Apr. 17, 2008

(65) Prior Publication Data
US 2010/0011270 A1    Jan. 14, 2010

(30) Foreign Application Priority Data
Oct. 5, 2006   (JP) ................................. 2006-273884

(51) Int. Cl.
*G06F 11/00* (2006.01)

(52) U.S. Cl.
USPC ........................................................ 714/749

(58) Field of Classification Search .................. 714/749
See application file for complete search history.

(56) References Cited

U.S. PATENT DOCUMENTS

2004/0215753 A1* 10/2004 Chan et al. ................... 709/223
2005/0141419 A1* 6/2005 Bergamasco et al. ......... 370/230
2005/0144303 A1* 6/2005 Zhang et al. .................. 709/231
2005/0152280 A1* 7/2005 Pollin et al. ................... 370/252
2005/0198350 A1   9/2005 Tan et al.

(Continued)

FOREIGN PATENT DOCUMENTS

CN    1671094 A    9/2005
CN    1767540 A    5/2006

(Continued)

OTHER PUBLICATIONS

1. Chinese Office Action w/Translation, dated Feb. 24, 2011, 22 pages.

(Continued)

*Primary Examiner* — Scott Baderman
*Assistant Examiner* — Jigar Patel
(74) *Attorney, Agent, or Firm* — Crowell & Moring LLP

(57) ABSTRACT

A first loss determination section 13 of a first communication device 10 determines that a data unit is lost if an acknowledgment response for the transmitted data unit from a second communication device 30 is not received within a predetermined time and retransmits the data unit when the determination is made. When a determination section 16 determines that a spurious timeout has occurred, a window control section 17 sets a target value for decreasing the size of a congestion window and then gradually decreases the size of the congestion window to the target value when the acknowledgment response is received. Therefore, in a case of executing a response algorithm for changing a slow start threshold and the congestion window, if a segment loss occurs subsequent to the spurious timeout, an efficient loss recovery is achieved and the throughput is improved.

23 Claims, 13 Drawing Sheets

U.S. PATENT DOCUMENTS

| | | | |
|---|---|---|---|
| 2005/0201279 A1 | 9/2005 | Tan et al. | |
| 2005/0254420 A1 | 11/2005 | Wager et al. | |
| 2006/0092838 A1 | 5/2006 | Lee | |
| 2006/0114830 A1 | 6/2006 | Shimonishi et al. | |
| 2007/0070906 A1* | 3/2007 | Thakur | 370/235 |

FOREIGN PATENT DOCUMENTS

| | | |
|---|---|---|
| EP | 1 077 559 A1 | 2/2001 |
| EP | 1 142 226 B1 | 7/2004 |
| EP | 1 536 589 A2 | 6/2005 |
| JP | 2005-136637 | 5/2005 |
| JP | 2005-269643 | 9/2005 |
| JP | 2005-533449 | 11/2005 |
| JP | 2006-129487 | 5/2006 |
| JP | 2006-157918 | 6/2006 |
| JP | 2006-173961 | 6/2006 |
| JP | 2006-217235 | 8/2006 |
| WO | WO 01/97438 A2 | 12/2001 |
| WO | WO 02/19654 A2 | 3/2002 |

OTHER PUBLICATIONS

Japanese Office Action w/Translation, dated Oct. 18, 2011, 8 pages.
PCT/JP2007/069607 Form PCT/IB/338—Notification of Transmittal of Translation of the International Preliminary Report of Patentability (1 page).
PCT/JP2007/069607 Form PCT/IB/373—International Preliminary Report on Patentability (1 page).
PCT/JP2007/069607 Form PCT/ISA/237—Written Opinion of the International Searching Authority (6 pages).
Go Hasegawa, et al., "Improvement of the Congestion Control Mechanism of TCP to Avoid Mis-retransmission", The Institute of Electronics, Information and Communication Engineers, pp. 2074-2084, Nov. 1999, IEICE vol. J82-B, No. 11 w/Partial Translation.
R. Ludwig, The Eifel Response Algorithm for TCP, Network Working Group, Request for Comments: 4015, Ludwig & Gurtov, HIIT, pp. 1-13, Feb. 2005.
Allman, et al., Enhancing TCP's Loss Recovery Using Limited Transmit, pp. 1-7, Network Working Group, Request for Comments: 3042, Jan. 2001.
R. Ludwig, et al., "The Eifel Detection Algorithm for TCP", Ericsson Research, pp. 1-11, Network Working Group, Request for Comments: 3522, Apr. 2003.
P. Sarolahti, et al., "Forward RTO-Recovery (F-RTO): An Algorithm for Detecting Spurious Retransmission Timeouts with TCP and the Stream Control Transmission Protocol (SCTP)", Nokia Research Center, University of Helsinki, pp. 1-17, Network Working Group, Request for Comments: 4138, Aug. 2005.
S. Floyd, et al., "The NewReno Modification to TCP's Fast Recovery Algorithm", ICSI, Boeing, TeliaSonera, pp. 1-15, Network Working Group, Request for Comments: 3782, Apr. 2004.
Pasi Sarolahti, "Congestion Control on Spurious TCP Retransmission Timeouts", Globecom '03, IEEE Global Telecommunications Conference, vol. 2, 2003, pp. 682-686.
Chinese Office Action w/Translation, dated Feb. 13, 2012, 7 pages total.
Sarolahti, et al., "F-RTO: An Enhanced Recovery Algorithm for TCP Retransmission Timeouts", ACM SIGCOMM Computer Communications Review, Apr. 1, 2003, pp. 51-63, vol. 33, No. 2, XP001224632.
Gurtov, et al., "Responding to Spurious Timeouts in TCP", IEEE, Mar. 30, 2003, pp. 2312-2322, XP002332458.
Swami, et al., "DCLOR: De-correlated Loss Recovery using SACK option for spurious timeouts", Internet Draft, Internet Engineering Task Force, Mar. 8, 2004, pp. 1-9, XP002332459.
Parsa, et al., "Improving TCP Congestion Control over Internets with Heterogeneous Transmission Media", IEEE, Oct. 31, 1999, pp. 213-221, XP10356956.
European Search Report, dated Oct. 5, 2012, 13 pages total.

* cited by examiner

COMMUNICATION SYSTEM, COMMUNICATION DEVICE, AND COMMUNICATION METHOD

TECHNICAL FIELD

The present invention relates to a communication system, a communication device, and a communication method applied to communication or the like using a congestion control of TCP (Transmission Control Protocol) and wireless TCP.

BACKGROUND ART

In a conventional communication system, to ensure reliable transmission of either (or both) of a segment indicating arbitrary TCP/IP (Internet Protocol) data or ACK (ACKowledgment) packets of an acknowledgment response, the TCP includes a mechanism that sets a retransmission timer when transmitting the segment and that assumes the segment is lost and performs retransmission if the ACK is not sent back within the set time.

However, in a communication environment with large delay variation such as mobile communication, the arrival of the ACK is delayed by a sudden increase of delays, and a retransmission timeout may occur although the segment is not lost. This is known as a spurious timeout.

There are the following two problems for the spurious timeout. The first one is that unnecessary retransmissions occur. The second one is that along with a retransmission timeout, a congestion window is decreased by the congestion control for adjusting the window size based on congestion information detected by a communication device on the transmitting side, and the throughput is reduced. In this regard, the congestion window is a TCP state variable that limits the transmittable size of TCP.

So far, there are proposals for a detection method of detecting the spurious timeout in a communication device on the transmitting side and a response method of recovering the state of congestion control of TCP after the detection of the spurious timeout. The detection methods and the response methods described below can be used by any combination.

Non-Patent Document 1 proposes an Eifel Detection algorithm as a spurious timeout detection method. The Eifel Detection algorithm uses a time stamp option of TCP to detect the spurious timeout. The communication device on the transmitting side stores the transmission time of the segment and determines the retransmission timeout as the spurious timeout if the time stamp sent back by the ACK matches the transmission time of the original segment.

Non-Patent Document 2 proposes an F-RTO (Forward RTO/Recovery) algorithm as a spurious timeout detection method. The F-RTO detects the spurious timeout based on the arrival pattern of the ACK immediately after the occurrence of the retransmission timeout.

Non-Patent Document 3 proposes an Eifel Response algorithm as a spurious timeout response method. After the detection of the spurious timeout, the Eifel Response algorithm recovers the state of the congestion control of TCP (slow start threshold and congestion window size) to the state before the retransmission timeout. By applying the above method, the communication can be continued without reducing the transmission speed even if the spurious timeout occurs.

Non-Patent Document 4 proposes the following two algorithms as spurious timeout response methods. The first algorithm decreases the slow start threshold to half the flight size and decreases the congestion window to one segment when the spurious timeout is detected. The flight size denotes the size of transmission data that is not transmission-acknowledged. The congestion window is later increased by the slow start. The method shows excellent throughput characteristics when the wireless bearer speed changes before and after the spurious timeout.

The second algorithm decreases the slow start threshold and the congestion window to half the flight size when the spurious timeout is detected. The congestion window is later increased according to a congestion avoidance algorithm. The method is effective when the wireless bearer is slow.

Next, the retransmission control of TCP will be described. The TCP includes a Fast Retransmit algorithm that immediately performs a retransmission after receiving three duplicate ACKs from the receiving device. Since the Fast Retransmit algorithm performs retransmission without waiting for the retransmission timeout, the Fast Retransmit algorithm can recover the loss faster than the retransmission method using a retransmission timer. If three duplicate ACKs are not received, the retransmission timer performs the loss recovery.

Non-Patent Document 5 proposes an algorithm called Limited Transmit that supports the operation of the Fast Retransmit algorithm. When the first and second duplicate ACKs are received, the Limited Transmit algorithm transmits unsent segments exceeding the congestion window by up to two segments. After receiving the segments, the receiving device sends back the duplicate ACKs. Therefore, the possibility of the execution of the loss recovery by the Fast Retransmit algorithm is increased.

Examples of conventional techniques of this type include Patent Documents 1 to 4.
Patent Document 1: JP 2006-217235 A
Patent Document 2: JP 2006-173961 A
Patent Document 3: JP 2006-157918 A
Patent Document 4: JP 2005-533449 A
Non-Patent Document 1: R. Ludwig and M. Meyer, "The Eifel Detection Algorithm for TCP," RFC3522, April 2003.
Non-Patent Document 2: P. Sarolahti and M. Kojo, "Forward RTO-Recovery (F-RTO): An Algorithm for Detecting Spurious Retransmission Timeouts with TCP and the Stream Control Transmission Protocol (SCTP)," RFC4138, August 2005.
Non-Patent Document 3: R. Ludwig and A. Gurtov, "The Eifel Response Algorithm for TCP," RFC4015, February 2005.
Non-Patent Document 4: P. Sarolahti, "Congestion Control on Spurious TCP Retransmission Timeouts," IEEE Globecom '03, vol. 2, pp. 682-686, December 2003.
Non-Patent Document 5: M. Allman, H. Balakrishnan, and S. Floyd, "Enhancing TCP's Loss Recovery Using Limited Transmit," RFC3042, January 2001. However, in the conventional communication systems described above, when the segment loss occurs subsequent to the spurious timeout, there are the following two problems for the response algorithm that decreases the slow start threshold and the congestion window when the spurious timeout is detected.

The first drawback relates to the Limited Transmit algorithm. After immediately decreasing the congestion window to a large extent when the spurious timeout is detected, if the segment loss occurs subsequent to the spurious timeout, the operation of the Limited Transmit algorithm may be inhibited. If the congestion window is decreased to a large extent, there will be a situation in which unsent segments are not included in a range of the congestion window size plus two segments. In such a situation, the Limited Transmit algorithm cannot transmit unsent segments when the first and second duplicate ACKs are received. As a result, loss recovery cannot be realized in an efficient manner, and the throughput is reduced.

The second drawback is that the slow start threshold is unnecessarily decreased when the segment loss occurs subsequent to the spurious timeout. In the TCP, only once is available for decreasing the slow start threshold at a round-trip time. However, in the method of decreasing the slow start threshold when the spurious timeout is detected, when the segment loss occurs subsequent to the spurious timeout, the slow start threshold is decreased twice when the spurious timeout is detected and when the segment loss is detected. When the slow start threshold is decreased, the rate of increase in the congestion window is prevented, and the throughput is reduced.

The present invention has been made in view of the foregoing problems, and an object of the present invention is to provide a communication system, a communication device, and a communication method, whereby loss recovery is enabled in an efficient manner to improve the throughput if a segment loss occurs subsequent to a spurious timeout while a response algorithm for changing a slow start threshold and a congestion window is being executed.

DISCLOSURE OF THE INVENTION

To attain the object, claim 1 of the present invention provides a communication system that transmits a data unit including one or a plurality of packet data, from a transmitting/receiving device to another transmitting/receiving device through a network, each transmitting/receiving device characterized by comprising: transmitting means for transmitting the data unit to the transmitting/receiving device on the receiving side; receiving means for receiving an acknowledgment response of the data unit transmitted from the transmitting/receiving device on the receiving side; first loss determination means for determining that the data unit is lost if the receiving means does not receive the acknowledgment response for the data unit within a predetermined time after the transmission of the data unit; retransmitting means for retransmitting the data unit when the first loss determination means determines that the data unit is lost; spurious timeout determination means for determining whether the determination result of the first loss determination means is caused by a delay of the data unit or the acknowledgment response and for determining that a spurious timeout has occurred when it is determined that the determination result is caused by the delay; and control means for controlling setting of a target value to decrease the size of a congestion window that controls the number of transmissions of the data unit when the spurious timeout has occurred, and then controlling the size of the congestion window to be decreased to the target value when the receiving means receives the acknowledgment response.

According to the configuration, a target value for decreasing the size of the congestion window is set in the transmitting/receiving device on the transmitting side when the spurious timeout has occurred. Subsequently, the size of the congestion window is gradually decreased to the target value when the acknowledgment response is received. Therefore, unsent data units (segments) can be transmitted with certainty, and as a result, efficient loss recovery is realized and the throughput is improved. Since the congestion window is immediately decreased to a large extent when the spurious timeout is detected in the conventional techniques, there is a situation in which unsent data units are not included in the congestion window. Therefore, unsent data units can not be transmitted when the first and second duplicate acknowledgment responses ACK are received.

Claim 2 of the present invention provides the communication system according to claim 1, characterized in that when the spurious timeout has occurred, the control means sets the size of the congestion window to either the target value or a flight size if the size of the congestion window is greater than the target value when acknowledgment responses of all transmitted data units are received upon the determination of the spurious timeout.

According to the configuration, in the transmitting/receiving device on the transmitting side, the congestion windows are set to the target value or the flight size at once when the appropriate transmissions of all transmitted data units are acknowledged upon the determination of the spurious timeout. Therefore, the number of transmissions of the data unit can be reliably controlled to the target value, and burst transmissions of the data unit can be avoided.

Claim 3 of the present invention provides a communication system that transmits a data unit including one or a plurality of packet data, from a transmitting/receiving device to another transmitting/receiving device through a network, each transmitting/receiving device characterized by comprising: transmitting means for transmitting the data unit to the transmitting/receiving device on the receiving side; receiving means for receiving an acknowledgment response of the data unit transmitted from the transmitting/receiving device on the receiving side; first loss determination means for determining that the data unit is lost if the receiving means does not receive the acknowledgment response for the data unit within a predetermined time after the transmission of the data unit; retransmitting means for retransmitting the data unit when the first loss determination means determines that the data unit is lost; spurious timeout determination means for determining whether the determination result of the first loss determination means is caused by a delay of the data unit or the acknowledgment response and for determining that a spurious timeout has occurred when determining that the determination result is caused by the delay; second loss determination means for detecting the loss of the data unit based on the acknowledgment response received by the receiving means; and controlling means for controlling the slow start threshold not to be decreased until acknowledgment responses of all transmitted data units are received upon the determination of the spurious timeout when the spurious timeout has occurred even if the second loss determination means detects the loss of the data unit.

According to the configuration, in the transmitting/receiving device on the transmitting side, the slow start threshold is not decreased until the appropriate transmissions of all transmitted data units are acknowledged upon the determination of the spurious timeout even if the loss of the data unit is detected. As a result, a flaw of the conventional techniques can be eliminated in which the slow start threshold is unnecessarily decreased when the data unit is lost, the rate of increase of the congestion window is prevented, and the throughput is reduced.

Claim 4 of the present invention provides a communication device that transmits a data unit including one or a plurality of packet data, to a receiving-side communication device through a network, the communication device characterized by comprising: transmitting means for transmitting the data unit to the receiving-side communication device; receiving means for receiving an acknowledgment response of the data unit transmitted from the receiving-side communication device; first loss determination means for determining that the data unit is lost if the receiving means does not receive the acknowledgment response for the data unit within a predetermined time after the transmission of the data unit; retransmitting means for retransmitting the data unit when the first loss determination means determines that the data unit is lost; spurious timeout determination means for determining whether the determination result of the first loss determination means is caused by a delay of either the data unit or the acknowledgment response and for determining that a spurious timeout has occurred when determining that the determination result is caused by the delay; and control means for controlling to set a target value for decreasing the size of a congestion window for controlling the number of transmissions of the data unit when the spurious timeout has occurred and to gradually decrease the size of the congestion window to the target value when the receiving means receives the acknowledgment response.

According to the configuration, the target value for decreasing the size of the congestion window is set when the spurious timeout has occurred. Subsequently, the size of the congestion window is gradually decreased to the target value when the acknowledgment response is received. Therefore, unsent data units (segments) are transmitted with certainty, and as a result, efficient loss recovery is realized and the throughput is improved.

Claim 5 of the present invention provides the communication device according to claim 4, characterized in that, when the spurious timeout has occurred, the control means sets the size of the congestion window to either the target value or a flight size if the size of the congestion window is greater than the target value when the acknowledgment responses of all data units transmitted before the retransmission of the data unit by the retransmitting means are received.

According to the configuration, the congestion windows are set to the target value or the flight size at once when the appropriate transmissions of all transmitted data units are acknowledged upon the determination of the spurious timeout. Therefore, unsent data units can be efficiently transmitted.

Claim 6 of the present invention provides the communication device according to claim 4 or 5, characterized in that the target value is 1/n of the flight size at the time of the determination of the spurious timeout.

Claim 7 of the present invention provides the communication device according to claim 4 or 5, characterized in that the target value is an amount of one data unit.

According to the configurations of claims 6 and 7, when decreasing the congestion window size, the congestion window can be appropriately decreased to prevent the situation in which unsent data units are not included in the congestion window as in the conventional techniques.

Claim 8 of the present invention provides a communication device that transmits a data unit including one or a plurality of packet data to a receiving-side communication device through a network, the communication device characterized by comprising: transmitting means for transmitting the data unit to the receiving-side communication device; receiving means for receiving an acknowledgment response of the data unit transmitted from the receiving-side communication device; first loss determination means for determining that the data unit is lost if the receiving means does not receive the acknowledgment response for the data unit within a predetermined time after the transmission of the data unit; retransmitting means for retransmitting the data unit when the first loss determination means determines that the data unit is lost; spurious timeout determination means for determining whether the determination result of the first loss determination means is caused by a delay of either the data unit or the acknowledgment response and for determining that a spurious timeout has occurred when determining that the determination result is caused by the delay; second loss determination means for detecting the loss of the data unit based on the acknowledgment response received by the receiving means; and controlling means for controlling the slow start threshold not to decrease until acknowledgment responses of all transmitted data units are received upon the determination of the spurious timeout when the spurious timeout has occurred even if the second loss determination means detects the loss of the data unit.

According to the configuration, the slow start threshold is not decreased until the appropriate transmissions of all transmitted data units are acknowledged upon the determination of the spurious timeout even if the loss of the data unit is detected. As a result, drawbacks of the conventional techniques are eliminated in which the slow start threshold is unnecessarily decreased when the data unit is lost, the rate of increase of the congestion window is prevented, so the throughput is reduced.

Claim 9 of the present invention provides a communication method of transmitting a data unit including one or a plurality of packet data, from a communication device on the transmitting side to a communication device on the receiving side through a network, the communication device on the transmitting side characterized by comprising: a first step of determining that the data unit is lost if an acknowledgment response for the data unit from the communication device on the receiving side is not received within a predetermined time after the transmission of the data unit; a second step of retransmitting the data unit when the first step determines that the data unit is lost; a third step of determining whether the determination result of the first step is caused by a delay of either the data unit or the acknowledgment response and of determining that a spurious timeout has occurred when determining that the determination result is caused by the delay; and a fourth step of setting a target value to decrease the size of the congestion window that controls the number of transmissions of the data unit when the third step determines that the spurious timeout has occurred, and then gradually decreasing the size of the congestion window to the target value when the acknowledgment response is received.

According to the method, a target value for decreasing the size of the congestion window is set in the communication device on the transmitting side when the spurious timeout has occurred. Subsequently, the size of the congestion window is gradually decreased to the target value when the acknowledgment response is received. Therefore, unsent data units (segments) are transmitted with certainty, and as a result, efficient loss recovery can be realized and the throughput is improved.

Claim 10 of the present invention provides a communication method of transmitting a data unit including one or a plurality of packet data, from a communication device on the transmitting side to a communication device on the receiving side through a network, the communication device on the transmitting side characterized by comprising: a first step of determining that the data unit is lost if an acknowledgment response for the data unit from the communication device on the receiving side is not received within a predetermined time after the transmission of the data unit; a second step of retransmitting the data unit when the first step determines that the data unit is lost; a third step of determining whether the determination result of the first step is caused by a delay of either the data unit or the acknowledgment response and of determining that a spurious timeout has occurred when determining that the determination result is caused by the delay; a fourth step of detecting the loss of the data unit based on the acknowledgment response received by the communication device on the transmitting side; and a fifth step of preventing a decrease in the slow start threshold until acknowledgment responses of all transmitted data units are received upon the determination of the spurious timeout when the spurious timeout has occurred even if the fourth step detects the loss of the data unit.

According to the method, in the communication device on the transmitting side, the slow start threshold is not decreased until the appropriate transmissions of all transmitted data units are acknowledged upon the determination of the spurious timeout even if the loss of the data unit is detected. As a result, drawbacks of the conventional techniques are eliminated in which the slow start threshold is unnecessarily decreased when the data unit is lost, the rate of increase of the congestion window is prevented, so the throughput is reduced.

Claim 11 of the present invention provides a communication system including a communication device that transmits and receives a data unit through a network, the communication device characterized by comprising: data unit transmitting means for transmitting the data unit to a communication device on the receiving side; receiving means for receiving an acknowledgment response transmitted by the communication device on the receiving side; duplicate response determination means for determining whether the acknowledgment response received by the receiving means is a duplicate response; first loss determination means for determining the loss of the data unit using a timer; spurious timeout determination means for determining whether the determination result in the first loss determination means is caused by a delay of the data unit or the acknowledgment response; and window control means for controlling the number of data unit transmissions using a window, wherein when the spurious timeout determination means determines that the determination result in the first loss determination means is caused by the delay of the data unit or the acknowledgment response, the window control means allows the transmission of unsent data units up to a predetermined number exceeding the window size by at least three data units, if the acknowledgment response received by the receiving means acknowledges the reception of a part of the data units transmitted before the retransmission based on the determination result of the first loss determination means and the duplicate response determination means determines that the acknowledgment response is a duplicate response.

Claim 12 of the present invention provides a communication device that transmits a data unit through a network, the communication device characterized by comprising: data unit transmitting means for transmitting the data unit to a communication device on the receiving side; receiving means for receiving an acknowledgment response transmitted by the communication device on the receiving side; duplicate response determination means for determining whether the acknowledgment response received by the receiving means is a duplicate response; first loss determination means for determining the loss of the data unit using a timer; spurious timeout determination means for determining whether the determination result in the first loss determination means is caused by a delay of the data unit or the acknowledgment response; and window control means for controlling the number of data unit transmissions using a window, wherein when the spurious timeout determination means determines that the determination result in the first loss determination means is caused by the delay of the data unit or the acknowledgment response, the window control means allows the transmission of unsent data units up to a predetermined number exceeding the window size by at least three data units, if the acknowledgment response received by the receiving means acknowledges the reception of a part of the data units transmitted before the retransmission based on the determination result of the first loss determination means, and if the duplicate response determination means determines that the acknowledgment response is a duplicate response.

Claim 13 of the present invention provides a communication method in a communication system including a communication device that transmits and receives a data unit through a network, the communication device characterized by comprising: data unit transmitting step of transmitting the data unit to a communication device on the receiving side; receiving step of receiving an acknowledgment response transmitted by the communication device on the receiving side; duplicate response determination step of determining whether the acknowledgment response received in the receiving step is a duplicate response; first loss determination step of determining the loss of the data unit using a timer; spurious timeout determination step of determining whether the determination result in the first loss determination step is caused by a delay of the data unit or the acknowledgment response; and window control step of controlling the number of data unit transmissions using a window, wherein when the spurious timeout determination step determines that the determination result in the first loss determination step is caused by the delay of the data unit or the acknowledgment response, the window control step allows the transmission of unsent data units up to a predetermined number exceeding the window size by at least three units, if the acknowledgment response received in the response receiving step acknowledges the reception of a part of the data units transmitted before the retransmission based on the determination result of the first loss determination step, and if the duplicate response determination step determines that the acknowledgment response is a duplicate response.

According to the inventions of claims 11 to 13, after the spurious timeout is detected, transmission of data units exceeding the window size by three or more data units is possible when first and second duplicate ACKs for data units transmitted before the timeout retransmission are received. Therefore, the Limited Transmit can be used even if the window size is, by two or more, smaller than the number of transmissions of data units in which the reception has not been confirmed. As a result, the throughput improvement effect by the Limited Transmit can be obtained.

Claim 14 of the present invention provides a communication system including a communication device that transmits and receives a data unit through a network, the communication device characterized by comprising: data unit transmitting means for transmitting the data unit to a communication device on the receiving side; receiving means for receiving an acknowledgment response transmitted by the communication device on the receiving side; first loss determination means for determining the loss of the data unit using a timer; spurious timeout determination means for determining whether the determination result in the first loss determination means is caused by a delay of the data unit or the acknowledgment response; and window control means for controlling the number of data unit transmissions using a window, wherein when the spurious timeout determination means determines that the determination result in the first loss determination means is caused by the delay of the data unit or the acknowledgment response, the window control means holds the window size until the reception of all data units transmitted before the retransmission based on the determination result of the first loss determination means is acknowledged even after the receiving means receives the acknowledgment response.

Claim 15 of the present invention provides a communication device that transmits a data unit through a network, the communication device characterized by comprising: data unit transmitting means for transmitting the data unit to a communication device on the receiving side; receiving means for receiving an acknowledgment response transmitted by the communication device on the receiving side; first loss determination means for determining the loss of the data unit using a timer; spurious timeout determination means for determining whether the determination result in the first loss determination means is caused by a delay of the data unit or the acknowledgment response; and window control means for controlling the number of data unit transmissions using a window, wherein when the spurious timeout determination means determines that the determination result in the first loss determination means is caused by the delay of the data unit or the acknowledgment response, the window control means holds the window size until the reception of all data units transmitted before the retransmission based on the determination result of the first loss determination means is acknowledged even after the receiving means receives the acknowledgment response.

Claim 16 of the present invention provides a communication method in a communication system including a communication device that transmits and receives a data unit through a network, the communication device characterized by comprising: data unit transmitting step of transmitting the data unit to a communication device on the receiving side; receiving step of receiving an acknowledgment response transmitted by the communication device on the receiving side; first loss determination step of determining the loss of the data unit using a timer; spurious timeout determination step of determining whether the determination result in the first loss determination step is caused by a delay of the data unit or the acknowledgment response; and window control step of controlling the number of data unit transmissions using a window, wherein when the spurious timeout determination step determines that the determination result in the first loss determination step is caused by the delay of the data unit or the acknowledgment response, the window control step holds the window size until the reception of all data units transmitted before the retransmission based on the determination result of the first loss determination step is acknowledged even after the receiving step receives the acknowledgment response.

According to the inventions of claims 14 to 16, when the spurious timeout is detected, the window size is not increased until the reception of all data units transmitted before the timeout retransmission is acknowledged even if the acknowledgment response is received. Therefore, the number of data units traveling over the network is held with accuracy at the target value set when the spurious timeout is detected. Since the number of data units entering the network is controlled with certainty to an intended value, thus preventing an unnecessary increase of network load and improving the performance of the network.

Claim 17 of the present invention provides a communication system including a communication device that transmits and receives a data unit through a network, the communication device characterized by comprising: data unit transmitting means for transmitting the data unit to a communication device on the receiving side; receiving means for receiving an acknowledgment response transmitted by the communication device on the receiving side; first loss determination means for determining the loss of the data unit using a timer; spurious timeout determination means for determining whether the determination result in the first loss determination means is caused by a delay of the data unit or the acknowledgment response; second loss determination means for determining the loss of the data unit based on the acknowledgment response from the communication device on the receiving side; loss recovery means for recovering the loss of the data unit when the second loss determination means determines that the data unit is lost; and window control means for controlling the number of data unit transmissions using a window, wherein when the spurious timeout determination means determines that the determination result in the first loss determination means is caused by a delay of the data unit or the acknowledgment response, the window control means increases the window size according to the number of acknowledgment responses used by the second loss determination means for determining the loss if the data unit determined by the second loss determination means to be lost is the data unit transmitted before the retransmission based on the determination result of the first loss determination means.

Claim 18 of the present invention provides the communication system according to claim 17, characterized in that when the spurious timeout determination means determines that the determination result in the first loss determination means is caused by a delay of the data unit or the acknowledgment response, the window control means increases the window size by the size corresponding to the number of data units that is the number of duplicate responses, if the data unit determined by the second loss determination means to be lost is the data unit transmitted before the retransmission based on the determination result of the first loss determination means, the duplicate responses being used by the second loss determination means for determining the loss.

Claim 19 of the present invention provides a communication device that transmits a data unit through a network, the communication device characterized by comprising: data unit transmitting means for transmitting the data unit to a communication device on the receiving side; receiving means for receiving an acknowledgment response transmitted by the communication device on the receiving side; first loss determination means for determining the loss of the data unit using a timer; spurious timeout determination means for determining whether the determination result in the first loss determination means is caused by a delay of the data unit or the acknowledgment response; second loss determination means for determining the loss of the data unit based on the acknowledgment response from the communication device on the receiving side; loss recovery means for recovering the loss of the data unit when the second loss determination means determines that the data unit is lost; and window control means for controlling the number of data unit transmissions using a window, wherein when the spurious timeout determination means determines that the determination result in the first loss determination means is caused by a delay of the data unit or the acknowledgment response, the window control means increases the window size according to the number of acknowledgment responses used by the second loss determination means for determining the loss if the data unit determined by the second loss determination means to be lost is the data unit transmitted before the retransmission based on the determination result of the first loss determination means.

Claim 20 of the present invention provides a communication method in a communication system including a communication device that transmits and receives a data unit through a network, the communication device characterized by comprising: data unit transmitting step of transmitting the data unit to a communication device on the receiving side; receiving step of receiving an acknowledgment response transmitted by the communication device on the receiving side; first loss determination step of determining the loss of the data unit using a timer; spurious timeout determining step of determining whether the determination result in the first loss determination step is caused by a delay of the data unit or the acknowledgment response; second loss determination step of determining the loss of the data unit based on the acknowledgment response from the communication device on the receiving side; loss recovery step of recovering the loss of the data unit when the second loss determination step determines that the data unit is lost; and window control step of controlling the number of data unit transmissions using a window, wherein when the spurious timeout determination step determines that the determination result in the first loss determination step is caused by the delay of the data unit or the acknowledgment response, the window control step increases the window size according to the number of acknowledgment responses used by the second loss determination step for determining the loss, if the data unit determined in the second loss determination step to be lost is the data unit transmitted before the retransmission based on the determination result of the first loss determination step.

According to the inventions of claims 17 to 20, if the loss of the data unit transmitted before the timeout retransmission is detected after the detection of the spurious timeout, the window size is increased according to the number of acknowledgment responses required for detecting the data unit.

For example, in the case of TCP, after three consecutive duplicate ACKs are received, it is determined that the data unit with the smallest sequence number in which the reception has not been acknowledged is lost. In this case, the window size is increased by the size corresponding to two data units that is the number of received duplicate ACKs minus one. Therefore, the number of duplicate ACKs indicating that the data unit is dropped off from the network is taken into consideration, so that the number of data units entering the network is controlled.

The reason for subtracting one from the number of received duplicate ACKs has a purpose of avoiding the window from being unnecessarily increased by the duplicate ACKs sent back by the data units excessively transmitted in the network due to the spurious timeout.

As a result, after the detection of the spurious timeout, the number of duplicate ACKs is taken into consideration, so that the number of data units in which the reception has not been acknowledged can be controlled with certainty to the window size even if the loss of the data unit transmitted before the timeout retransmission is detected. Since the number of data units entering the network is controlled with certainty, an unnecessary increase of the network load is prevented, thereby improving the performance of the network.

Claim 21 of the present invention provides a communication system including a communication device that transmits and receives a data unit through a network, the communication device characterized by comprising: data unit transmitting means for transmitting the data unit to a communication device on the receiving side; receiving means for receiving an acknowledgment response transmitted by the communication device on the receiving side; first loss determination means for determining the loss of the data unit using a timer; spurious timeout determination means for determining whether the determination result in the first loss determination means is caused by a delay of the data unit or the acknowledgment response; second loss determination means for determining the loss of the data unit based on the acknowledgment response from the communication device on the receiving side; loss recovery means for recovering the loss of the data unit when the second loss determination means determines that the data unit is lost; and window control means for controlling the number of data unit transmissions using a window, wherein the loss recovery means holds a threshold for determining the completion of the loss recovery according to the value of the acknowledgment response received by the receiving means and sets the threshold for determining the completion of the loss recovery to a value corresponding to the maximum sequence number of the data units that are already transmitted at the time of the retransmission based on the determination result of the first loss determination means if the spurious timeout determination means determines that the determination result in the first loss determination means is caused by the delay of the data unit or the acknowledgment response when the second loss determination means determines that the data unit transmitted before the retransmission based on the determination result of the first loss determination means is lost.

Claim 22 of the present invention provides a communication device that transmits a data unit through a network, the communication device characterized by comprising: data unit transmitting means for transmitting the data unit to a communication device on the receiving side; receiving means for receiving an acknowledgment response transmitted by the communication device on the receiving side; first loss determination means for determining the loss of the data unit using a timer; spurious timeout determination means for determining whether the determination result in the first loss determination means is caused by a delay of the data unit or the acknowledgment response; second loss determination means for determining the loss of the data unit based on the acknowledgment response from the communication device on the receiving side; loss recovery means for recovering the loss of the data unit when the second loss determination means determines that the data unit is lost; and window control means for controlling the number of data unit transmissions using a window, wherein the loss recovery means holds a threshold for determining the completion of the loss recovery according to the value of the acknowledgment response received by the receiving means and sets the threshold for determining the completion of the loss recovery to a value corresponding to the maximum sequence number of the data units that are already transmitted at the time of the retransmission based on the determination result of the first loss determination means, if the spurious timeout determination means determines that the determination result in the first loss determination means is caused by the delay of the data unit or the acknowledgment response when the second loss determination means determines that the data unit transmitted before the retransmission based on the determination result of the first loss determination means is lost.

Claim 23 of the present invention provides a communication method in a communication system including a communication device that transmits and receives a data unit through a network, the communication device characterized by comprising: data unit transmitting step of transmitting the data unit to a communication device on the receiving side; receiving step of receiving an acknowledgment response transmitted by the communication device on the receiving side; first loss determination step of determining the loss of the data unit using a timer; spurious timeout determination step of determining whether the determination result in the first loss determination step is caused by a delay of the data unit or the acknowledgment response; second loss determination step of determining the loss of the data unit based on the acknowledgment response from the communication device on the receiving side; loss recovery step of recovering the loss of the data unit when the second loss determination step determines that the data unit is lost; and window control step of controlling the number of data unit transmissions using a window, wherein the loss recovery step holds a threshold for determining the completion of the loss recovery according to the value of the acknowledgment response received in the receiving step and sets the threshold for determining the completion of the loss recovery to a value corresponding to the maximum sequence number of the data units that are already transmitted at the time of the retransmission based on the determination result of the first loss determination step, if the spurious timeout determination step determines that the determination result in the first loss determination step is caused by the delay of the data unit or the acknowledgment response when the second loss determination step determines that the data unit transmitted before the retransmission based on the determination result of the first loss determination step is lost.

According to the inventions of claims 21 to 23, after setting a threshold for determining the completion of the loss recovery to the value as described above, the loss recovery for not decreasing the window size is performed on the data unit transmitted before the timeout retransmission. After an acknowledgment response for a data unit with the sequence number greater than the threshold is received and the loss recovery is temporarily terminated, the loss recovery for decreasing the window size can be performed for the loss of the data unit detected afterwards. As a result, when the loss of the data unit transmitted after the timeout retransmission is detected, the window is decreased and the network load is alleviated. Therefore, the performance of the network is improved.

Furthermore, since the operation realized using one threshold, the installation is facilitated.

BEST MODE FOR CARRYING OUT THE INVENTION

First Embodiment

Figure 1:
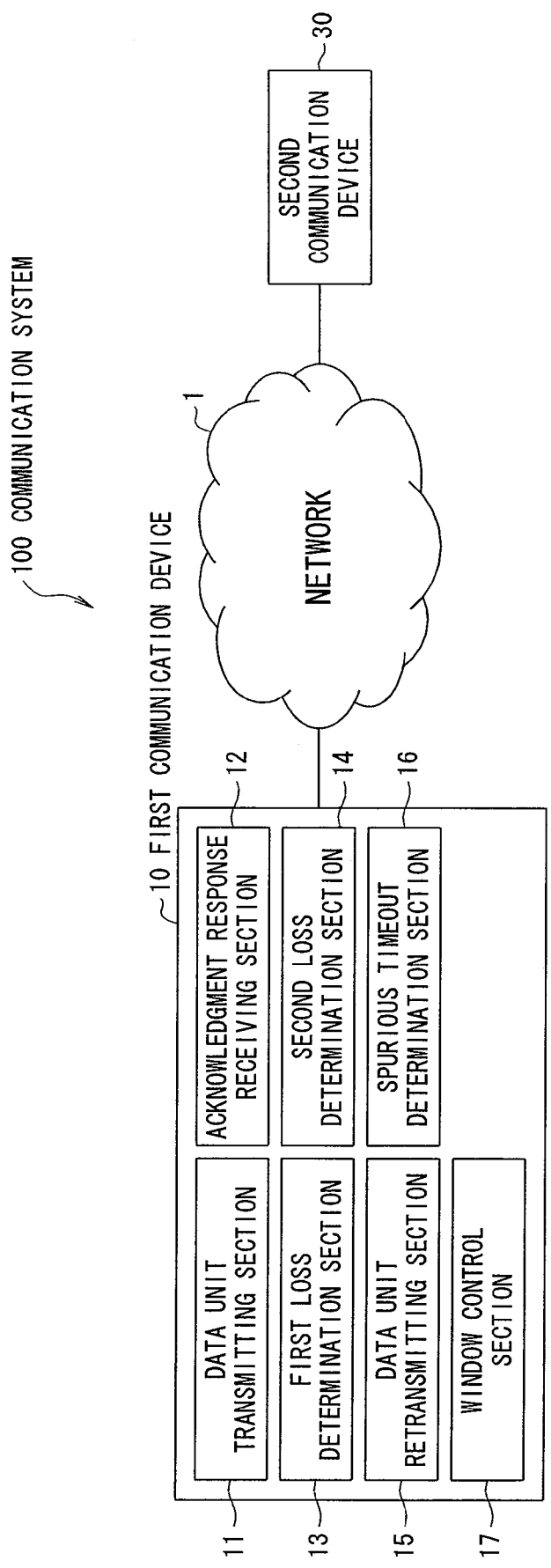
FIG. 1 illustrates a block diagram of a configuration of a communication system according to a first embodiment of the present invention.

A first embodiment of the present invention will now be described with reference to the drawings. In this regard, the corresponding parts are designated with the same reference numerals throughout the drawings in the present application, and the description of the overlapping parts will be appropriately omitted.

FIG. 1 is a block diagram of a configuration of a communication system according to the first embodiment of the present invention.

In the configuration of a communication system 100 illustrated in FIG. 1, a first communication device (communication device or transmitting/receiving device on the transmitting side) 10 and a second communication device (communication device or transmitting/receiving device on the receiving side) 30 are connected through a wireless and/or wired network 1. Although the first communication device 10 and the second communication device 30 are connected through one network 1 in the present embodiment, a plurality of networks may exist between the devices. The present invention is effective in a network in which signal delays suddenly increase. For example, the present invention is effective when the network 1 is a mobile communication network. In that case, either or both of the first and second communication devices 10 and 30 corresponds to a cellular phone.

The first communication device 10 as a characteristic element of the present embodiment comprises a data unit transmitting section (transmitting means) 11, an acknowledgment response receiving section (receiving means) 12, a first loss determination section (first loss determination means) 13, a second loss determination section (second loss determination means) 14, a data unit retransmitting section (retransmitting means) 15, a spurious timeout determination section (spurious timeout determination means) 16, and a window control section (control means) 17. The second communication device 30 may comprise the above components 11 to 17.

The data unit transmitting section 11 transmits a data unit that is an aggregation of one or a plurality of packets to the second communication device 30 through the network 1. The acknowledgment response receiving section 12 receives an acknowledgment response transmitted by the second communication device 30 through the network 1.

The first loss determination section 13 uses a timer to execute a loss determination of data unit. The timer is set when the data unit is transmitted, whereas the timer is stopped when an acknowledgment response for the data unit is received. When the timer expires, it is determined that the data unit is lost.

The second loss determination section 14 determines the loss of the data unit based on the acknowledgment response transmitted by the second communication device 30. Specifically, the second loss determination section 14 determines that the data unit with the smallest sequence number in which the reception has not been acknowledged is lost when there are three consecutively received duplicate ACKs. The data unit loss-determined by the first loss determination section 13 or the second loss determination section 14 is retransmitted by the data unit retransmitting section 15.

When the first loss determination section 13 determines that the data unit is lost, the spurious timeout determination section 16 determines whether the determination is caused by a delay of the data unit or the acknowledgment response. Specifically, when the first loss determination section 13 determines that the data unit is lost, the spurious timeout determination section 16 determines whether an acknowledgment response that is later received is a duplicate ACK. If the acknowledgment response is not a duplicate ACK, the spurious timeout determination section 16 determines that the spurious timeout has occurred. The window control section 17 adjusts the window size to be described below in detail in the operational description when the determination result of the spurious timeout determination section 16 is affirmative.

Figure 2:
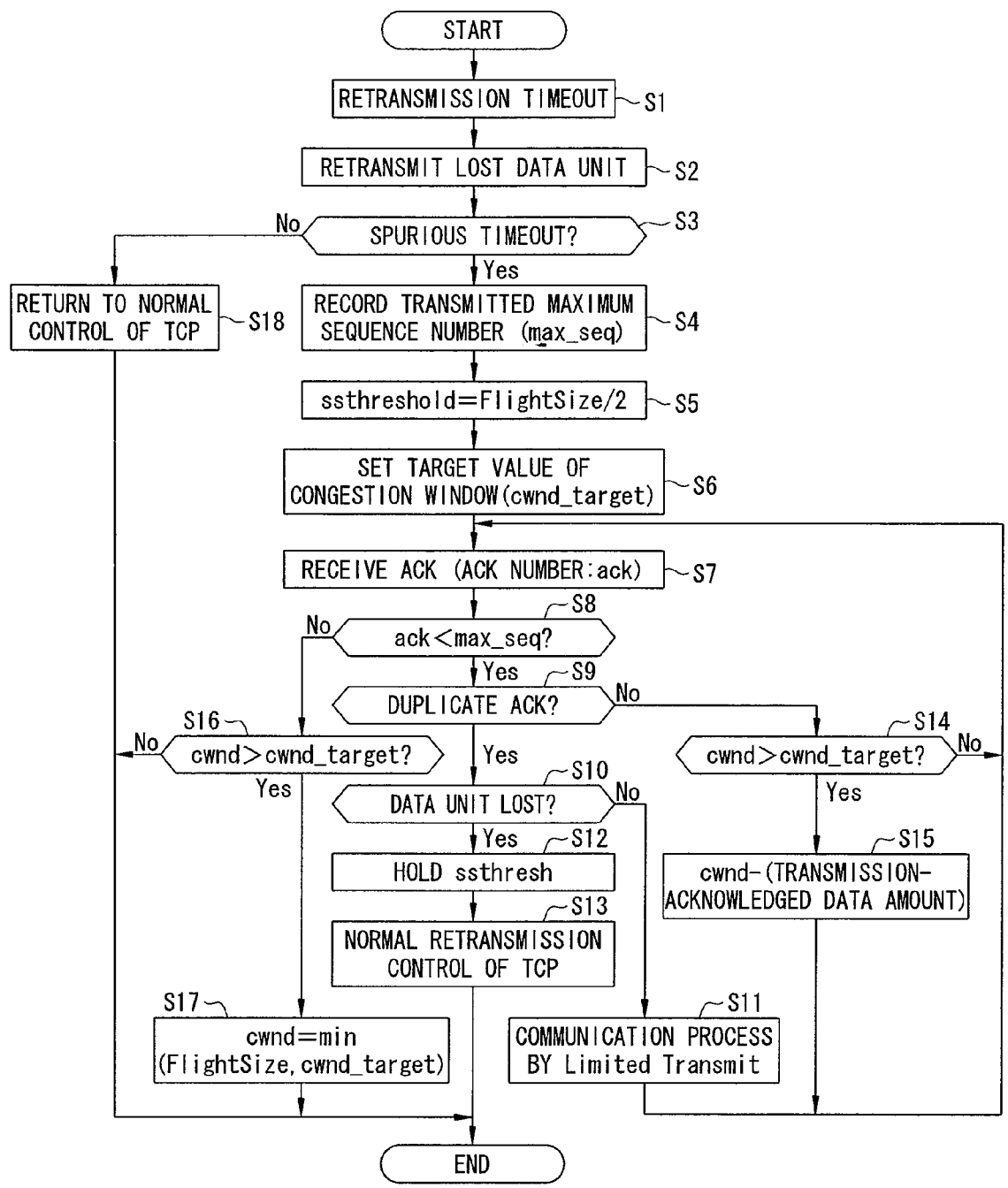
FIG. 2 illustrates a flow chart of a flow of a communication process of a first communication device in the communication system of the present embodiment.
Figure 3:
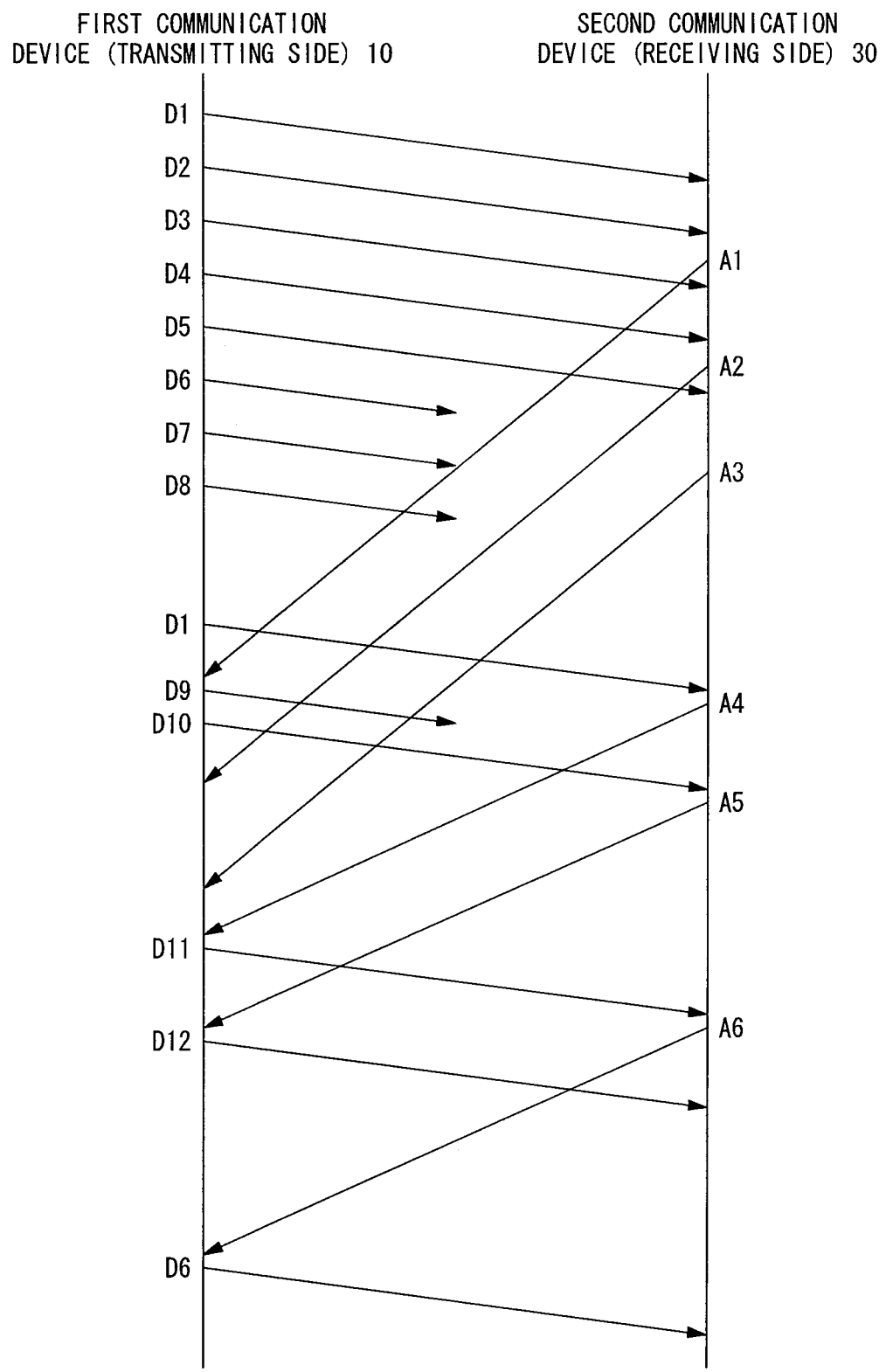
FIG. 3 illustrates a sequence diagram of an example of communication in the communication system of the present embodiment.

An operation of the communication system 100 in the configuration described above will be described with reference to FIG. 2 and FIG. 3. FIG. 2 is a flow chart illustrating a communication process of the first communication device 10. FIG. 3 illustrates a sequence diagram of an example of communication in the communication system 100.

In this regard, the present embodiment describes that the first communication device 10 on the transmitting side and the second communication device 30 on the receiving side communicate with the TCP used for the protocol of the transport layer. FIG. 3 illustrates a sequence from a state in which the TCP connection is already established between the first communication device 10 and the second communication device 30 and the size of a congestion window held by the first communication device 10 is 8K bytes. Each size of the data units D1 to D12 is 1000 bytes.

It is assumed that the data unit transmitting section 11 of the first communication device 10 has sequentially transmitted the data units D1 to D8 in 8 kilobytes in total, which are allowed by the congestion windows with sequence number 1000 (corresponding to D1) to sequence number 8000 (D8), to the second communication device 30 through the network 1.

It is further assumed that the data units D6 to D8 with sequence numbers 6000 (D6), 7000 (D7), and 8000 (D8) among the transmitted data units D1 to D8 are lost in the network 1 due to a factor such as congestion.

After receiving the data units D1 and D2, the second communication device 30 transmits an acknowledgment response A1 for the data units D1 and D2 to the first communication device 10. Similarly, after receiving the data units D3 and D4, the second communication device 30 transmits an acknowledgment response A2. Subsequently, although the second communication device 30 receives the data unit D5, the second communication device 30 transmits an acknowledgment response A3 only for the data unit D5 in this occasion, because the following data unit is lost.

It is assumed that the acknowledgment responses A1 to A5 transmitted by the second communication device 30 have arrived at the first communication device 10 later.

If the arrival of the acknowledgment response A1 is delayed in step S1, the timer set for the data unit D1 is timed out in the first loss determination section 13 of the first communication device 10, and the loss of the data unit D1 is determined. In this case, since it is determined that the data unit D1 is lost, the data unit retransmitting section 15 retransmits the data unit D1 in step S2.

After the acknowledgment response receiving section 12 of the first communication device 10 receives the acknowledgment response A1 for the data units D1 and D2, the spurious timeout determination section 16 starts a spurious timeout determination process in step S3.

When the acknowledgment response A1 is received, the data unit transmitting section 11 immediately transmits the next data units D9 and D10. After receiving the acknowledgment response A2, the spurious timeout determination section 16 determines whether the acknowledgment response A2 is a duplicate ACK. If the acknowledgment response A2 is not a duplicate ACK as a result of the determination, in other words, if the spurious timeout determination section 16 determines that the loss is caused by the delay of the data unit, the spurious timeout determination section 16 determines that the spurious timeout has occurred. In this case, the processing proceeds to step S4. The data unit D9 is assumed to be lost in the network.

In step S4, the window control section 17 of the first communication device 10 records the maximum value (max_seq=10999) of the sequence numbers of the data units that have already been transmitted.

In step S5, the window control section 17 decreases a value of a slow start threshold to half the 8K bytes (4K bytes) of the flight size (size of the data unit currently existing in the communication channel) (ssthreshold=FlightSize/2). Although the value of the slow start threshold is reduced to half the flight size, the value may be 1/n of the flight size (ssthreshold=FlightSize/n) as long as the value is smaller than the flight size (where n is a positive number).

Subsequently, in step S6, the window control section 17 sets a target value (cwnd_target) of the congestion window to the value of the slow start threshold that has been updated earlier (4K bytes).

After the acknowledgment response receiving section 12 of the first communication device 10 receives the acknowledgment response A4 in step S7, the window control section 17 determines in step S8 whether the ACK of the received acknowledgment response A4 is smaller than the maximum sequence number max_seq recorded in step S4. If the ACK of the acknowledgment response A4 is smaller as a result of the determination, the second loss determination section 14 determines in step S9 whether the acknowledgment response A4 is a duplicate ACK. The second loss determination section 14 determines that the acknowledgment response A4 is a duplicate ACK since the data unit D6 is lost.

Consequently, although the second loss determination section 14 determines whether there is a loss of a data unit in step S10, the second loss determination section 14 determines that there is no loss of data unit since only one duplicate ACK has consecutively been received. As a result, the first communication device 10 transmits the data unit D11 that is next in the order in accordance with a Limited Transmit algorithm in step S11. The Limited Transmit algorithm is a conventional technique that executes a process of transmitting unsent segments exceeding the congestion window up to two segments at most when the first and second duplicate ACKs are received. After receiving the segments, the receiving device sends back the duplicate ACKs.

Similarly, in steps S7 to S11, after receiving the next acknowledgment response A5, the first communication device 10 determines whether it is a duplicate ACK. If the result indicates a duplicate ACK, the first communication device 10 determines whether there is a loss of a data unit. If the determination is No, the first communication device 10 transmits the data unit D12 that is next in the order.

Further similarly, in steps S7 to S11, the first communication device 10 receives the next acknowledgment response A6 and determines whether it is a duplicate ACK. If the result indicates a duplicate ACK, the first communication device 10 determines whether there is a loss of a data unit. The first communication device 10 determines in step S10 that the data unit is lost because there are three duplicate ACKs A4 to A6 that have consecutively been received.

In this case, the window control section 17 shifts to a loss recovery process by a Fast Retransmit/Fast Recovery algorithm in step S12. The Fast Retransmit/Fast Recovery algorithm executes a process of the Fast Retransmit algorithm and executes a retransmission without waiting for the retransmission timeout, thereby executing a process of recovering the loss faster than a retransmission method using a retransmission timer.

Also, in step S12, the value of the slow start threshold is held at the value of 4K bytes (ssthresh) without being decreased. In step S13, a normal TCP retransmission control is performed, and the process of the entire flow is finished.

Meanwhile, if the acknowledgment response A4 is determined not to be a duplicate ACK in step S9, the window control section 17 determines whether the current congestion window size cwnd is greater than the congestion window target value cwnd_target in step S14. If the window control section 17 determines that the current congestion window size cwnd is greater, the window control section 17 subtracts a transmission-acknowledged data amount from the congestion window size in step S15. In this case, the processing returns to step S7. The processing also returns to step S7 when the window control section 17 determines in step S14 that the current congestion window size cwnd is smaller than the congestion window target value cwnd_target.

Subsequently, when the processing of steps S7 to S15 is repeated, the control of the window control section 17 gradually decreases the congestion window size cwnd to the congestion window target value cwnd_target.

If the window control section 17 determines in step S8 that the ACK number of the acknowledgment response A4 received by the acknowledgment response receiving section 12 is greater than the currently recorded maximum sequence number max_seq, the window control section 17 determines in step S16 whether the current congestion window size cwnd is greater than the congestion window target value cwnd_target.

If the current congestion window size cwnd is determined to be greater, the window control section 17 sets the congestion window size cwnd to either the current flight size FlightSize or the congestion window target value cwnd_target in step S17. After the setting, the processing of the entire flow is finished.

The processing of the entire flow is also finished when the current congestion window size cwnd is determined to be smaller than the congestion window target value cwnd_target in step S16. If it is determined that the spurious timeout has not occurred in step S3, the processing returns to the normal TCP congestion control in step S18. That is, a control process is executed so that the slow start threshold is set to half the congestion window size and the congestion window size is updated to one segment.

As described, according to the communication system 100 of the present embodiment, after the transmission of the data unit from the data unit transmitting section 11 of the first communication device 10, the first loss determination section 13 determines that the data unit is lost when the acknowledgment response receiving section 12 does not receive the acknowledgment response of the transmitted data unit within a predetermined time, and the data unit retransmitting section 15 retransmits the data unit when the determination is made. The spurious timeout determination section 16 then determines whether the determination result of the first loss determination section 13 is caused by a delay of either the data unit or the acknowledgment response. The spurious timeout determination section 16 determines that the spurious timeout has occurred when the spurious timeout determination section 16 determines that the determination result is caused by a delay of the data unit. If the spurious timeout determination section 16 determines that the spurious timeout has occurred, the window control section 17 sets the target value for decreasing the congestion window size for controlling the number of transmissions of the data unit and controls the congestion window size to be gradually decreased to the target value when the acknowledgment response receiving section 12 receives the acknowledgment response.

In this way, in the communication device 10 on the transmitting side, the target value for decreasing the congestion window size is set when the spurious timeout has occurred, and then the congestion window size is gradually decreased to the target value when the acknowledgment response is received. Therefore, unsent data units (segments) can be transmitted with certainty, and as a result, efficient loss recovery is realized and the throughput is improved. In the conventional techniques, the congestion window is immediately decreased to a large extent when the spurious timeout is detected, thereby causing a situation in which unsent data units are not included in the congestion window. This results in unsent data units that cannot be transmitted when first and second duplicate acknowledgment responses ACK are received.

When the spurious timeout has occurred, the window control section 17 sets the congestion window size to either the target value or the flight size if the congestion window size is greater than the target value, when the acknowledgment responses of all data units transmitted before the retransmission of the data unit by the data unit retransmitting section 15 are received.

In this way, the congestion windows are set to the target value or the flight size at once when the communication device 10 on the transmitting side acknowledges that all transmitted data units are appropriately transmitted at the time of the determination of the spurious timeout. Therefore, the unsent data units are transmitted in an efficient manner.

The first communication device 10 further includes the second loss determination section 14 that detects the loss of the data unit based on the acknowledgment response received by the acknowledgment response receiving section 12. The window control section 17 holds the slow start threshold applied for setting the target value, and when the spurious timeout occurs, the slow start threshold is not decreased until the acknowledgment responses of all data units transmitted before the retransmission of the data unit by the data unit retransmitting section 15 are received even if the second loss determination section 14 detects a loss of the data unit.

In this way, the slow start threshold is not decreased until the communication device 10 on the transmitting side acknowledges that all transmitted data units are appropriately transmitted upon the determination of the spurious timeout even if the loss of data unit is detected. This eliminates drawbacks, of the conventional techniques, including that the slow start threshold is unnecessarily decreased when the data unit is lost, the rate of increase of the congestion window is suppressed, and the throughput is reduced.

The target value is set to ½ of the flight size or to an amount of one data unit.

Accordingly, when the congestion window size is decreased, the congestion window can be appropriately decreased to prevent the situation in which unsent data units are not included in the congestion window as in the conventional techniques.

Figure 4:
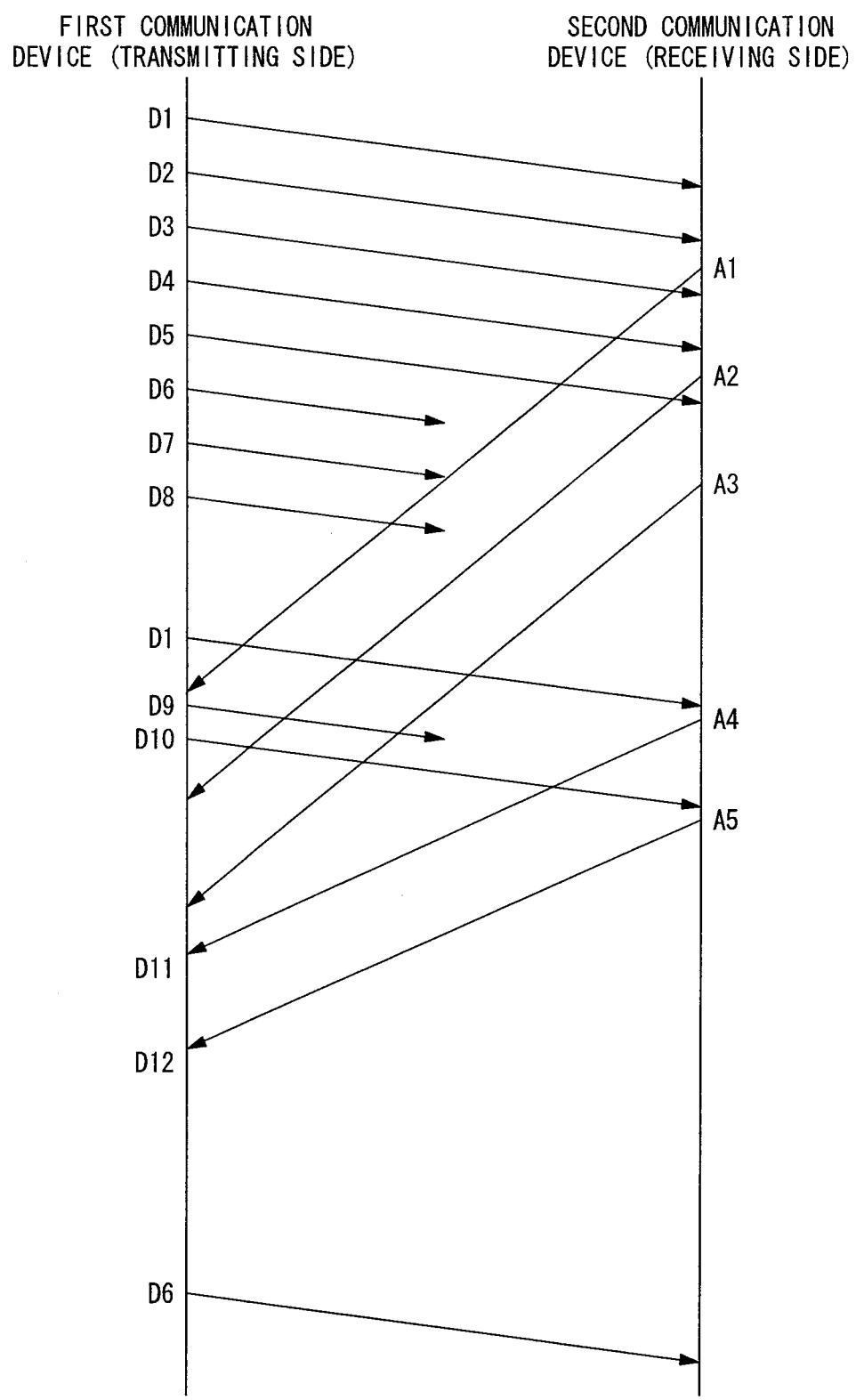
FIG. 4 illustrates a sequence diagram of an example of communication in a conventional communication system.

In order to further describe advantages of the communication system 100 according to the present embodiment, comparison with a communication behavior of a conventional communication system shown as a sequence diagram of FIG. 4 will be described.

An operation until a first communication device on the transmitting side, which is conventionally employed, receives the acknowledge response A3 transmitted from a second communication device on the receiving side is the same as the operation of the above-described embodiment.

The spurious timeout determination becomes affirmative when the first communication device receives the acknowledgment response A2, and the first communication device immediately decreases the slow start threshold and the congestion window. Since the congestion window is decreased, the first communication device cannot transmit another data unit when receiving the acknowledgment response A4. As a result, the number of duplicate ACKs that can be consecutively received is two at the maximum. Therefore, the loss recovery process by the Fast Retransmit/Fast Recovery algorithm cannot be executed as with the present embodiment. In the first communication device, the timer for loss determination of data unit is timed out, so a timeout retransmission is performed. Since the slow start threshold and the congestion window are decreased again, the throughput is lowered.

Second Embodiment

Next, a second embodiment of the present invention will be described.

Figure 5:
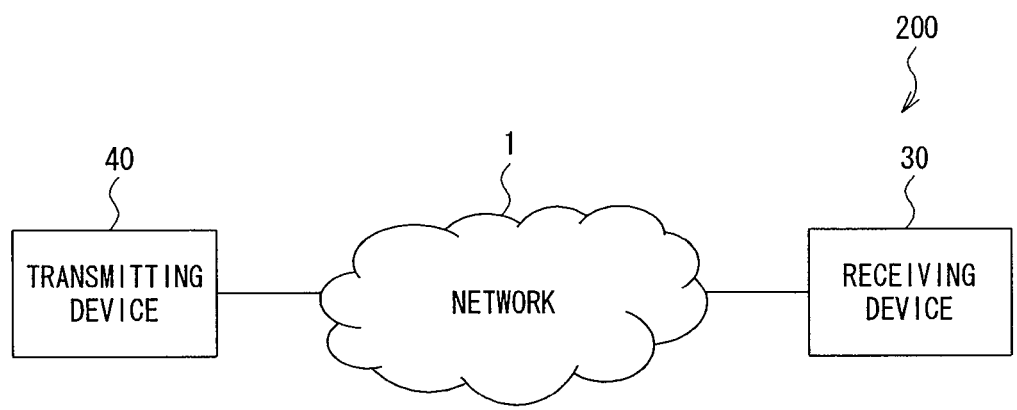
FIG. 5 illustrates a block diagram of a configuration of a communication system according to a second embodiment.

FIG. 5 illustrates a block diagram of a configuration of a communication system according to the second embodiment of the present invention.

In the configuration of a communication system 200 shown in FIG. 5, a first communication device (transmitting device in this case) 40 and the second communication device (receiving device in this case) 30 are connected through the wireless and/or wired network 1. Although the first communication device 40 and the second communication device 30 are connected through the network 1 in the present embodiment, multiple networks may exist between the devices. The present invention works in an effective manner in a network in which signal delays suddenly increase. For example, the present invention is effective in a case where the network 1 is a mobile communication network. In this case, either or both of the first and second communication devices 40 and 30 corresponds to a cellular phone.

Figure 6:
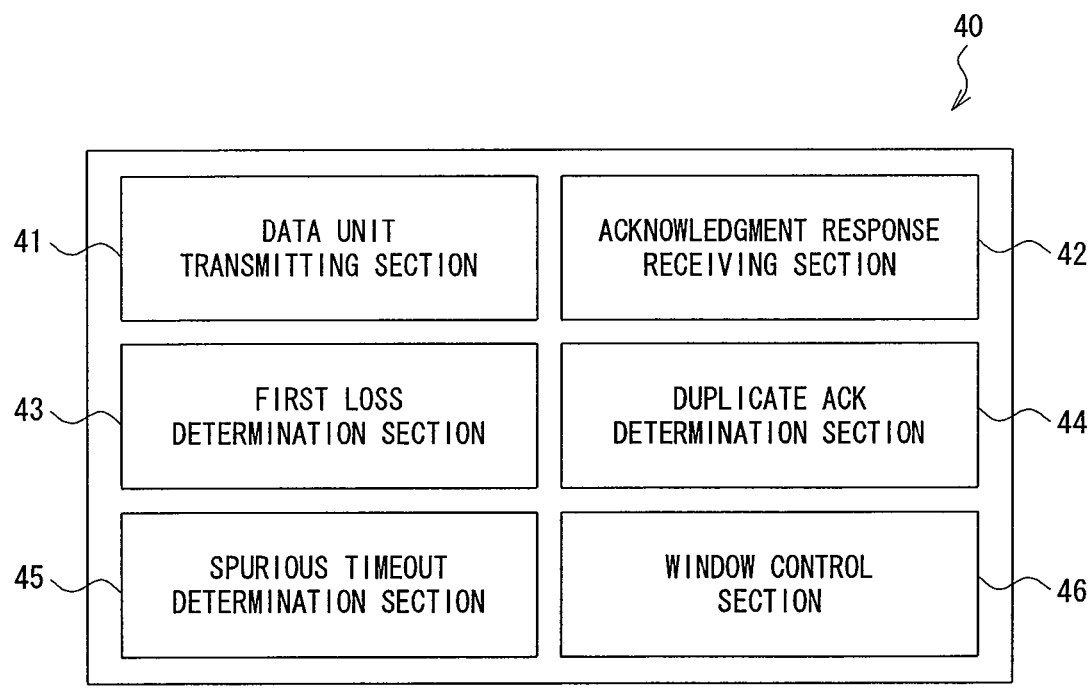
FIG. 6 illustrates a block diagram of a configuration of a first communication device 40 according to the second embodiment.

FIG. 6 illustrates a block diagram of a configuration of the first communication device 40 according to the present embodiment.

In FIG. 6, the first communication device 40 includes a data unit transmitting section (transmitting means) 41, an acknowledgment response receiving section (receiving means) 42, a first loss determination section (first loss determination means) 43, a duplicate ACK determination section (duplicate ACK determination means) 44, a spurious timeout determination section (spurious timeout determination means) 45, and a window control section (control means) 46.

The data unit transmitting section 41 transmits a data unit that is an aggregation of one or multiple packets to the second communication device 30 through the network 1. The acknowledgment response receiving unit 42 receives an acknowledgment response transmitted by the second communication device 30 through the network 1.

The first loss determination section 43 uses a timer to execute a loss determination of data unit. The timer is set when the data unit is transmitted, whereas the timer is stopped when an acknowledgment response for the data unit is received. When the timer expires, it is determined that the data unit is lost.

The duplicate ACK determination section 44 determines whether the acknowledgment response received by the acknowledgment response receiving section 42 is a duplicate ACK. The duplicate ACK determination section 44 determines that the data unit is lost when there are three duplicate ACKs that have consecutively been received.

When the first loss determination section 43 determines that the data unit is lost, the spurious timeout determination section 45 determines whether the determination is caused by a delay of the data unit or the acknowledgment response. Specifically, when the first loss determination section 43 determines that the data unit is lost, the spurious timeout determination section 45 determines that the spurious timeout has occurred if the duplicate ACK determination section 44 determines that the acknowledgment response that is later received is not a duplicate ACK. The window control section 46 adjusts the window size, to be described later in detail in the operational description in a case where the determination result of the spurious timeout determination section 45 is affirmative.

Figure 7:
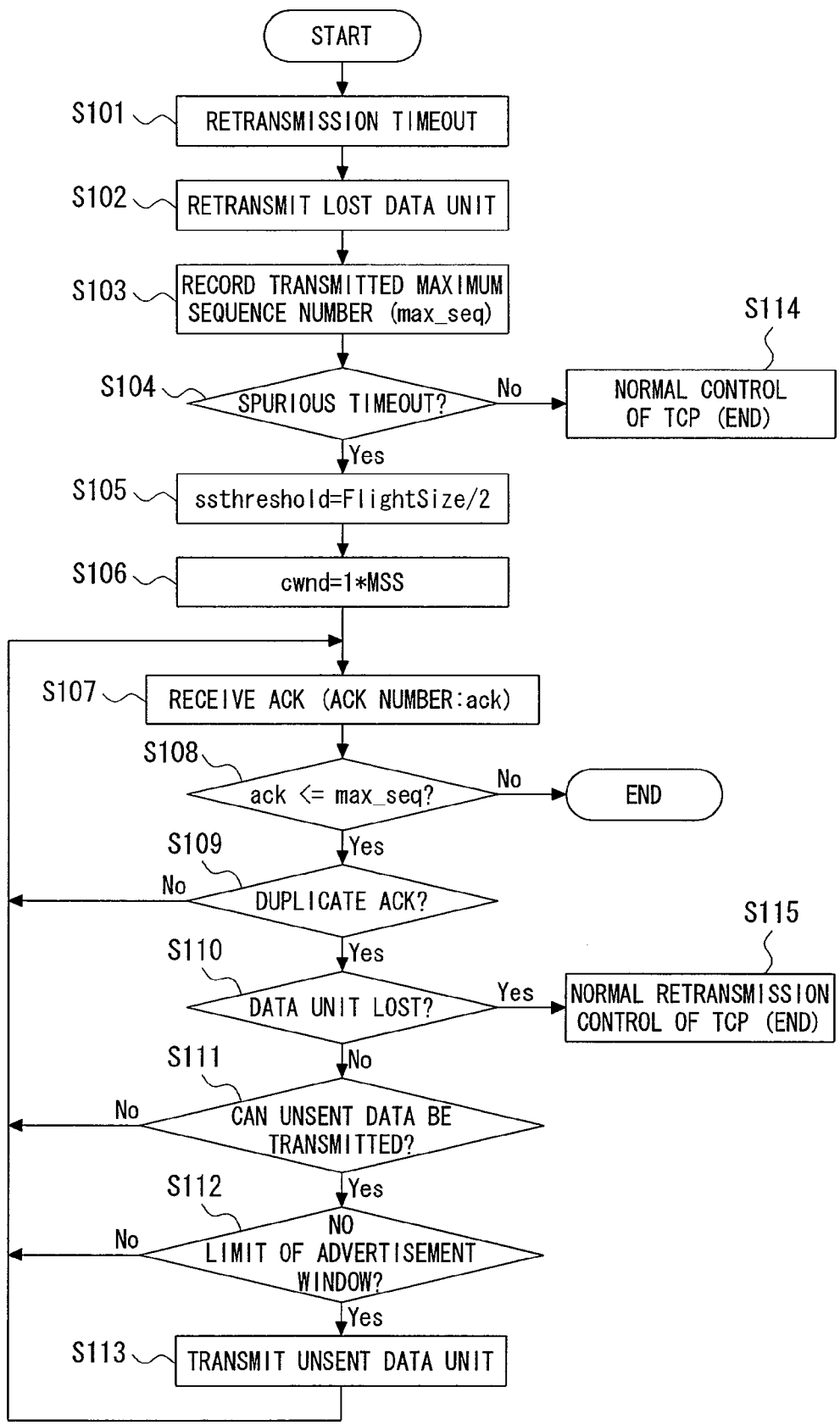
FIG. 7 illustrates a flow chart of a flow of a communication process of the first communication device 40.
Figure 8:
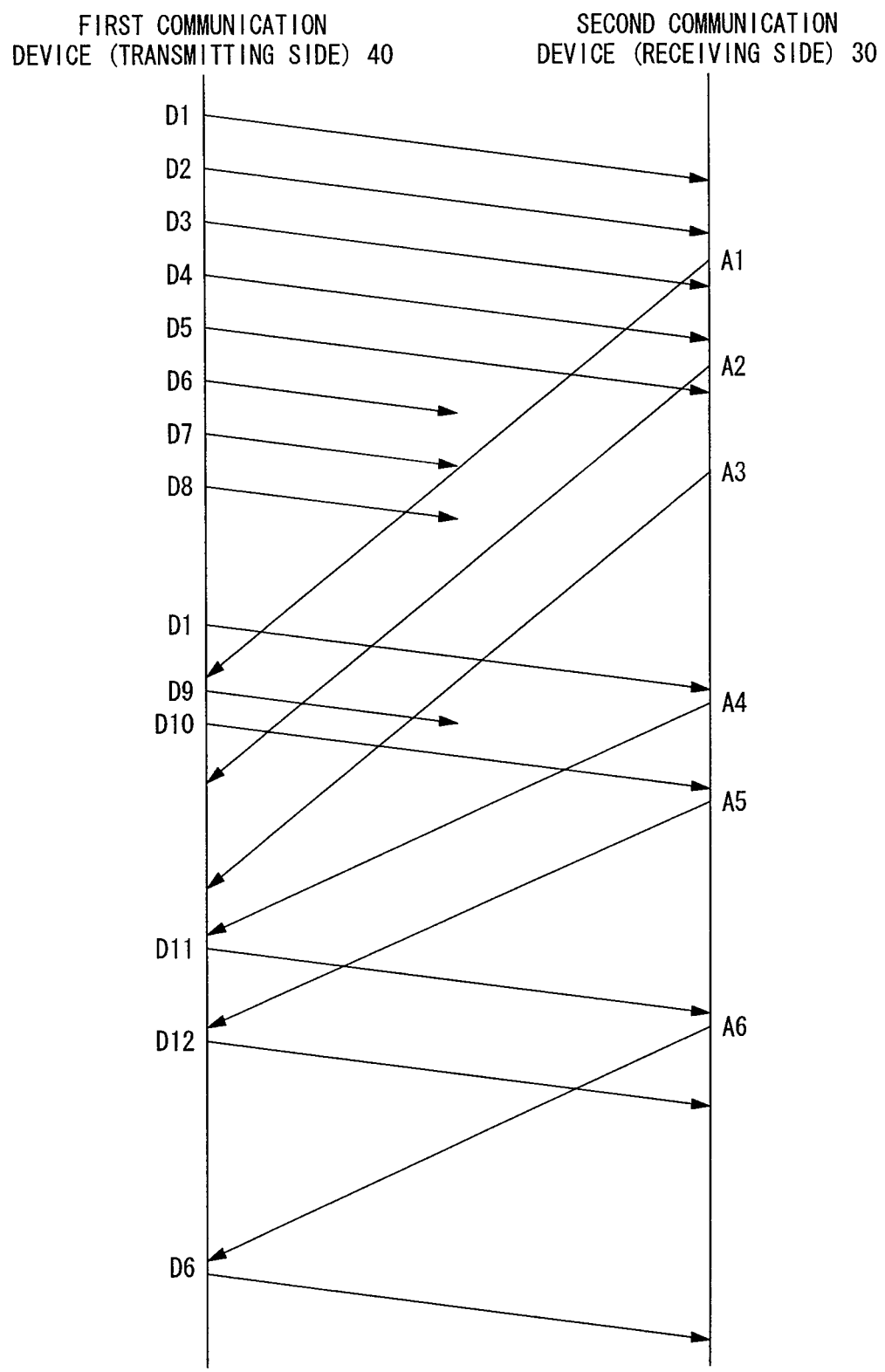
FIG. 8 illustrates a sequence diagram of an example of communication in a communication system 200.

An operation of the communication system 200 in the above-described configuration will now be described with reference to FIG. 7 and FIG. 8. FIG. 7 illustrates a flow chart of a flow of a communication process of the first communication device 40. FIG. 8 illustrates a sequence diagram indicative of an example of communication in the communication system 200.

In this regard, the present embodiment describes that the first communication device 40 on the transmitting side and the second communication device 30 on the receiving side communicate with each other with the TCP used for the protocol of the transport layer. FIG. 7 depicts a sequence from a state in which the TCP connection is already established between the first communication device 40 and the second communication device 30 and 8K bytes is the congestion window size retained by the first communication device. The size of the data units D1 to D12 is 1000 bytes each.

It is assumed that the data unit transmitting section 41 of the first communication device 40 has sequentially transmitted the data units D1 to D8 in 8 kilobytes in total, which are allowed by the congestion windows with sequence number 1000 (corresponding to D1) to sequence number 8000 (D8), to the second communication device 30 through the network 1.

It is further assumed that the data units D6 to D8 with sequence numbers 6000 (D6), 7000 (D7), and 8000 (D8) among the transmitted data units D1 to D8 are lost in the network 1 due to congestion, or the like.

After receiving the data units D1 and D2, the second communication device 30 transmits the acknowledgment response A1 for the data units D1 and D2 to the first communication device 40. Similarly, after receiving the data units D3 and D4, the second communication device 30 transmits the acknowledgment response A2. Subsequently, although the second communication device 30 receives the data unit D5, the second communication device 30 transmits the acknowledgment response A3 only for the data unit D5 in this occasion, because the following data unit is lost.

It is assumed that the acknowledgment responses A1 to A5 transmitted by the second communication device 30 have arrived at the first communication device 40 later.

If the arrival of the acknowledgment response A1 is delayed in step S101, the timer set for the data unit D1 is timed out in the first loss determination section 43 of the first communication device 40, and the loss determination of the data unit D1 is executed. In this case, since it is determined that the data unit D1 is lost, the data unit transmitting section 41 retransmits the data unit D1 in step S102.

In step S103, the window control section 46 of the first communication device 40 records the maximum value of the sequence number (max_seq=8999) of the data units that have already been transmitted.

After the acknowledgment response receiving section 42 of the first communication device 40 receives the acknowledgment response A1 for the data units D1 and D2, the spurious timeout determination section 45 starts a spurious timeout determination process in step S104.

When the acknowledgment response A1 is received, the data unit transmitting section 41 immediately transmits the next data units D9 and D10. After receiving the acknowledgment response A2, the spurious timeout determination section 45 determines whether the acknowledgment response A2 is a duplicate ACK. If the acknowledgment response A2 is not a duplicate ACK as a result of the determination, in other words, if the spurious timeout determination section 45 determines that the loss is caused by the delay of the data unit, the spurious timeout determination section 45 determines that the spurious timeout has occurred. In this case, the process proceeds to step S105. The data unit D9 is assumed to be lost in the network.

In step S105, the window control section 46 decreases the value of the slow start threshold to half the 8K bytes (4K bytes) of the flight size (size of the data unit currently existing in the communication channel) (ssthreshold=FlightSize/2). Although the value of the slow start threshold is reduced to half the flight size, the value may be 1/n of the flight size (ssthreshold=FlightSize/n) as long as the value is smaller than the flight size (where n is a positive number).

Subsequently, in step S106, the window control section 46 sets the congestion window (cwnd) to the size corresponding to one data unit (MSS: Maximum Segment Size).

After the acknowledgment response receiving section 42 of the first communication device 40 receives the acknowledgment response A4 in step S107, the window control section 46 determines in step S108 whether the ACK number of the received acknowledgment response A4 is equal to or smaller than the maximum sequence number max_seq recorded in step S103. The number of the acknowledgment response A4 at this point is ack=6000, and the maximum sequence number, max_seq=8999.

As a result of the determination in step S108, if the ACK number of the acknowledgment response A4 is equal to or smaller than the maximum sequence number max_seq, the duplicate ACK determination section 44 determines whether the acknowledgment response A4 is a duplicate ACK in step S109. The duplicate ACK determination section 44 determines that the acknowledgment response A4 is a duplicate ACK since the data unit D7 is lost.

Subsequently, in step S110, the duplicate ACK determination section 44 determines the loss of the data unit. Since there is one duplicate ACK that has been consecutively received, the duplicate ACK determination section 44 determines that the data unit is not lost.

In step S111, the window control section 46 determines whether the transmission of unsent data is possible. It is assumed that the first communication device 40 can transmit the unsent data.

In step S112, the window control section 46 determines whether there is a limit in an advertisement window. In this case, the size of the advertisement window advertized by the second communication device 30 does not limit the size of the data unit that the first communication device 40 attempts to transmit. Therefore, the window control section 46 determines in step S112 that there is no limit in the advertisement window.

In step S113, the data unit transmitting section 41 of the first communication device 40 transmits the unsent data unit D11 to the second communication device 30.

Similarly, in steps S107 to S113, after receiving the next acknowledgment response A5, the first communication device 40 determines whether it is a duplicate ACK. If the result indicates a duplicate ACK, the first communication device 40 determines whether there is a loss of a data unit. When the result of the loss determination is No, the unsent data can be transmitted (step S111: Yes), and there is no limit in the advertisement window (step S112: Yes), the first communication device 40 transmits the data unit D12 that is next in the order.

As the first communication device 40 transmits the data unit D11, the second communication device 30 sends back the third duplicate ACK (A6). Since three duplicate ACKs A4 to A6 that have consecutively been received at this point, it is determined in step S110 that the data unit is lost.

In this case, the window control section 46 shifts to a loss recovery process by a Fast Retransmit/Fast Recovery algorithm in step S115. The Fast Retransmit/Fast Recovery algorithm executes a process of the Fast Retransmit algorithm and also executes a retransmission without waiting for the retransmission timeout, thereby executing a process of recovering the loss faster than a retransmission method using a retransmission timer.

In step S104, the spurious timeout determination section 45 determines whether the acknowledgment response A2 is a duplicate ACK. If the spurious timeout determination section 45 determines that the acknowledgment response A2 is a duplicate ACK (when the spurious timeout has not occurred), the first communication device 40 returns to the normal TCP congestion control in step S114.

If it is determined in step S108 that the ACK number of the received acknowledgment response A4 is not equal to or smaller than the maximum sequence number max_seq recorded in step S103, the first communication device 40 ends the process of the entire flow.

If it is determined in step S109 that the received acknowledgment response A4 is not a duplicate ACK, or if it is determined in step S111 that the transmission of unsent data is not possible, the processing returns to step S107.

Similarly, if it is determined in step S112 that there is a limit of advertisement window, or after step S113, the processing returns to step S107.

According to the processing, when the first communication device 40 receives the acknowledgment responses A4 and A5, the unsent data units can be transmitted even if the size of the data unit in which the reception has not been acknowledged (6000 bytes) is greater by two or more data units than the congestion window size (4000 bytes). Therefore, the loss recovery by fast retransmission is possible.

Third Embodiment

Next, a third embodiment of the present invention will be described.

Figure 9:
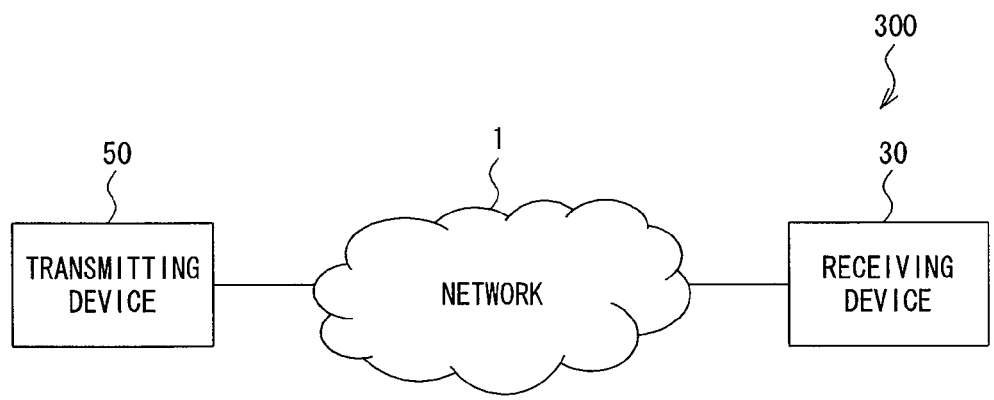
FIG. 9 illustrates a block diagram of a configuration of a communication system according to a third embodiment.

FIG. 9 illustrates a block diagram indicative of a configuration of a communication system according to the third embodiment.

In the configuration of a communication system 300 illustrated in FIG. 9, a first communication device (transmitting device in this case) 50 and the second communication device (receiving device in this case) 30 are connected with each other through the wireless and/or wired network 1. Although the first communication device 50 and the second communication device 30 are connected with each other through the network 1 according to the present embodiment, multiple networks may exist between the devices. The present invention works in an effective manner in a network in which signal delays suddenly increase. For example, the present invention works in an effective manner in a case where the network 1 is a mobile communication network. In this case, either or both of the first and second communication devices 50 and 30 corresponds to a cellular phone.

Figure 10:
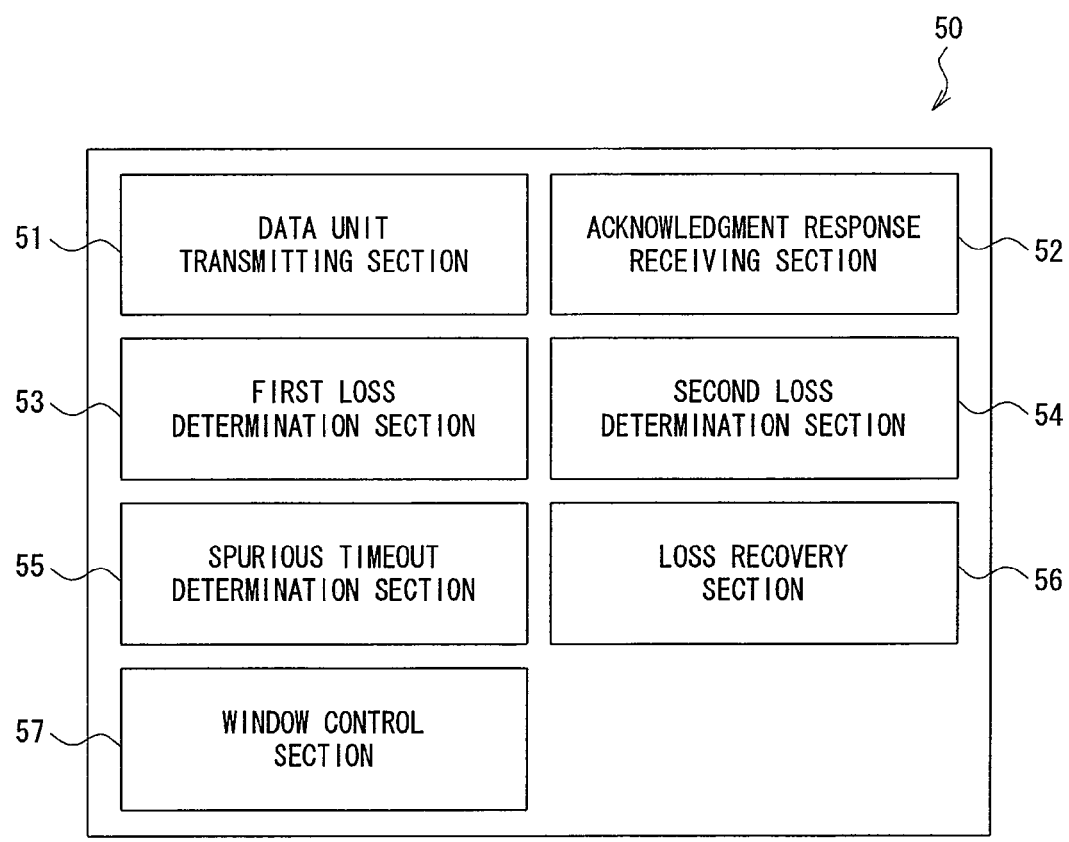
FIG. 10 illustrates a block diagram of a first communication device 50 according to the third embodiment.

FIG. 10 illustrates a block diagram of a configuration of the first communication device 50 according to the present embodiment.

In FIG. 10, the first communication device 50 comprises a data unit transmitting section (transmitting means) 51, an acknowledgment response receiving section (receiving means) 52, a first loss determination section (first loss determination means) 53, a second loss determination section (second loss determination means) 54, a spurious timeout determination section (spurious timeout determination means) 55, a loss recovery section 56 (loss recovery means), and a window control section (control means) 57.

The data unit transmitting section 51 transmits a data unit that is an aggregation of one or multiple packets to the second communication device 30 through the network 1. The acknowledgment response receiving section 52 receives an acknowledgment response transmitted by the second communication device 30 through the network 1.

The first loss determination section 53 uses a timer to execute a loss determination of data unit. The timer is set when the data unit is transmitted, whereas the timer is stopped when an acknowledgment response for the data unit is received. When the timer expires, it is determined that the data unit is lost.

The second loss determination section 54 determines whether there is a loss of a data unit based on the acknowledgment response transmitted by the second communication device 30. Specifically, the second loss determination section 54 determines that the data unit with the smallest sequence number in which the reception has not been acknowledged is lost when there are three duplicate ACKs that have consecutively been received.

When the first loss determination section 53 determines that the data unit is lost, the spurious timeout determination section 55 determines whether the determination is caused by a delay of the data unit or the acknowledgment response. Specifically, when the first loss determination section 53 determines that the data unit is lost, the spurious timeout determination section 55 determines whether an acknowledgment response that is later received is a duplicate ACK. If the acknowledgment response is not a duplicate ACK, the spurious timeout determination section 55 determines that the spurious timeout has occurred.

The loss recovery section 56 executes a loss recovery process when the second loss determination section 54 determines that the data unit is lost.

The window control section 57 adjusts the window size to be described later in detail in the operational description when the determination result of the spurious timeout determination section 55 is affirmative.

Figure 11:
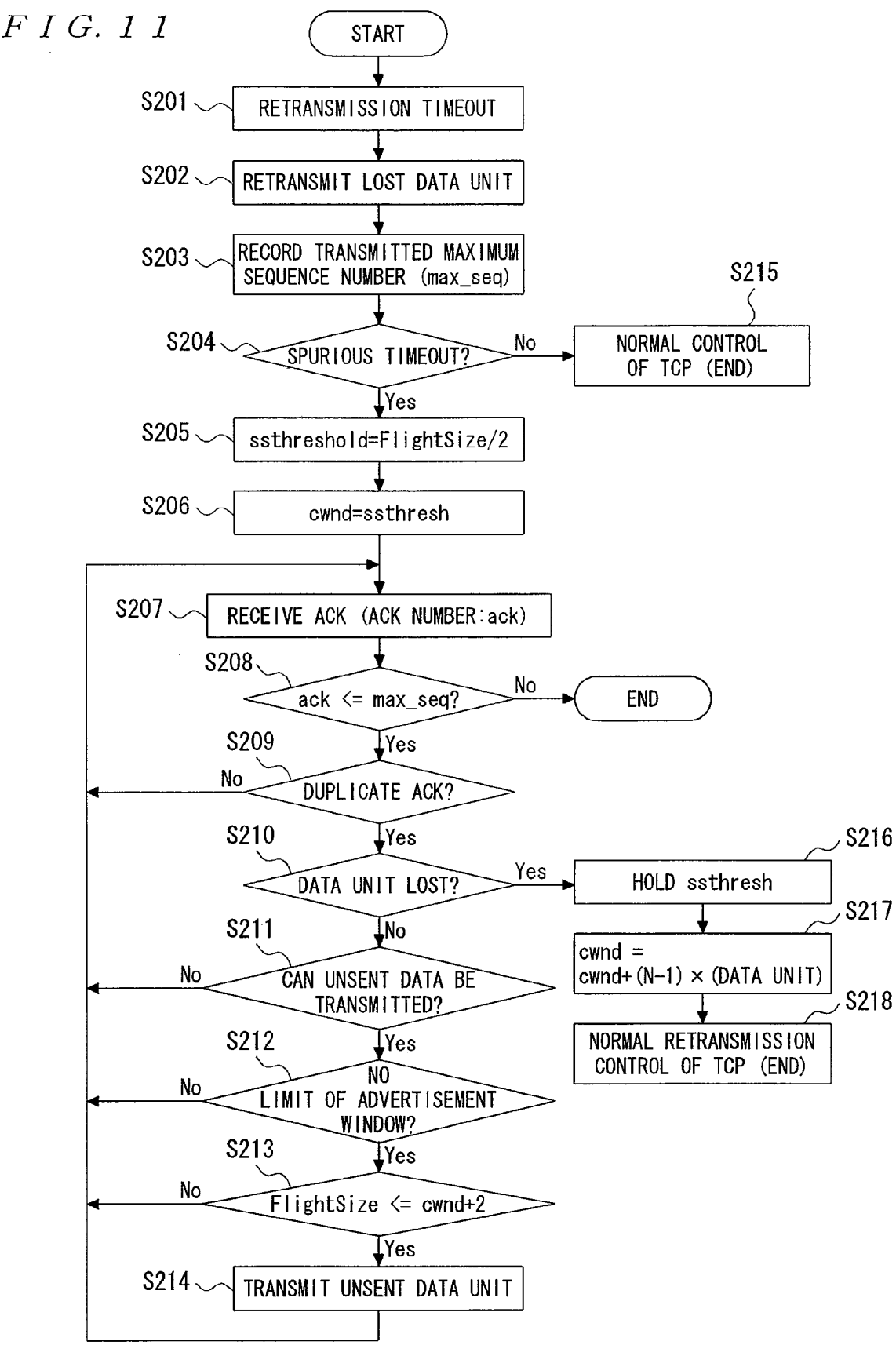
FIG. 11 illustrates a flow chart of a flow of a communication process of the first communication device 50.
Figure 12:
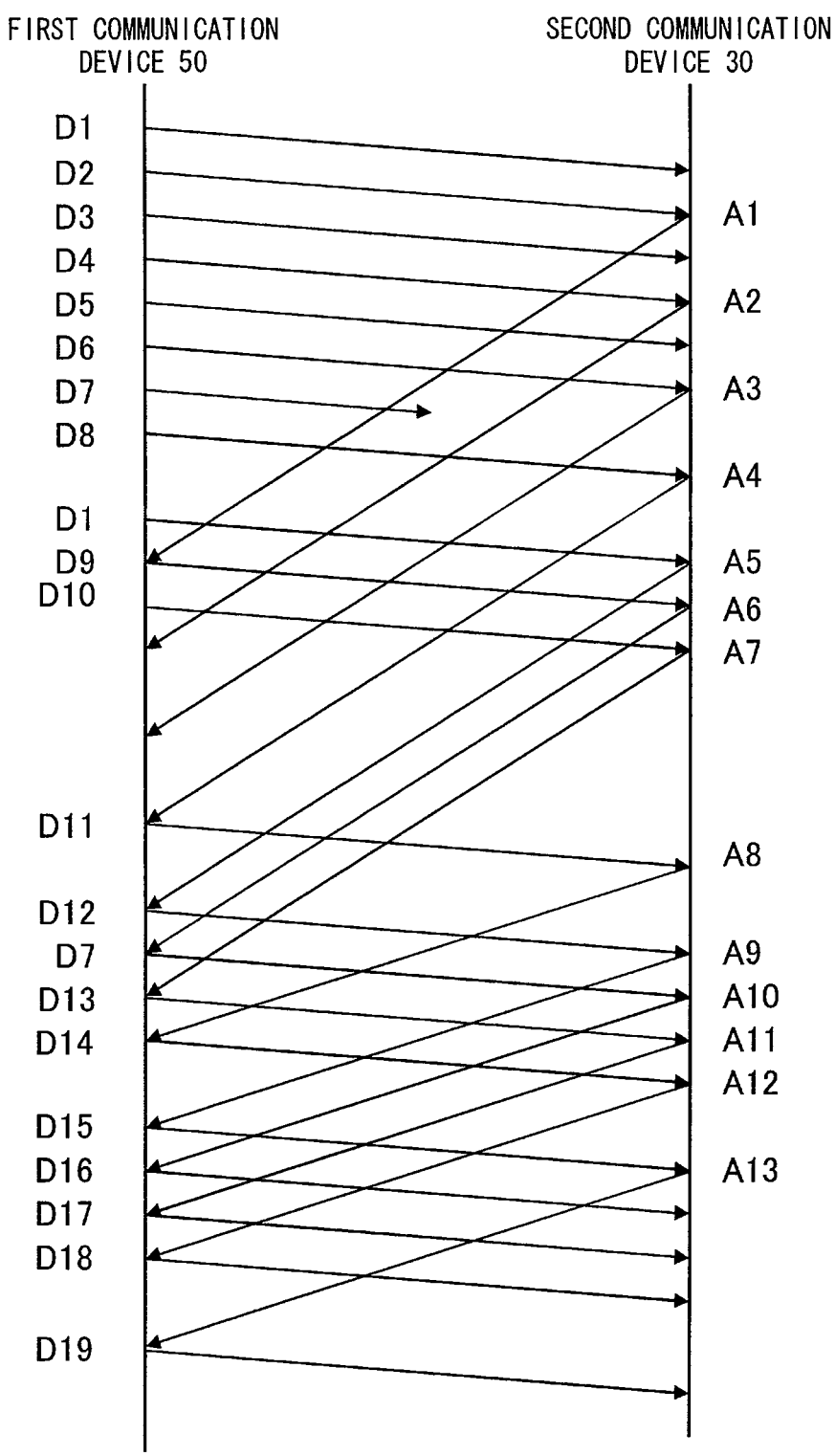
FIG. 12 illustrates a sequence diagram of an example of communication in a communication system 300.

An operation of the communication system 300 in the configuration described above will be described with reference to FIG. 11 and FIG. 12. FIG. 11 illustrates a flow chart indicative of a flow of a communication process of the first communication device 50. FIG. 12 illustrates a sequence diagram indicative of an example of communication in the communication system 300.

In this regard, the present embodiment describes that the first communication device 50 on the transmitting side and the second communication device 30 on the receiving side communicate with the TCP used for the protocol of the transport layer. FIG. 12 depicts a sequence from a state in which the TCP connection is already established between the first communication device 50 and the second communication device 30 and the size of the congestion window held by the first communication device 50 is 8K bytes. The size of the data units D1 to D19 is 1000 bytes each.

It is assumed that the data unit transmitting section 51 of the first communication device 50 has sequentially transmitted the data units D1 to D8 in 8 kilobytes in total, which are allowed by the congestion windows with sequence number 1000 (corresponding to D1) to sequence number 8000 (D8), to the second communication device 30 through the network 1.

It is further assumed that the data unit D7 with sequence number 7000 (D7) among the transmitted data units D1 to D8 is lost in the network 1 due to congestion or the like.

After receiving the data units D1 and D2, the second communication device 30 transmits the acknowledgment response A1 for the data units D1 and D2 to the first communication device 50. Similarly, the second communication device 30 transmits the acknowledgment response A2 after receiving the data units D3 and D4, and transmits the acknowledgment response A3 after receiving the data units D5 and D6.

It is assumed that the acknowledgment responses A1 to A3 transmitted by the second communication device 30 have arrived at the first communication device 50 later.

If the arrival of the acknowledgment response A1 is delayed in step S201, the timer set for the data unit D1 is timed out in the first loss determination section 53 of the first communication device 50, and the loss determination of the data unit D1 is executed. In this case, since it is determined that the data unit D1 is lost, the data unit transmitting section 51 retransmits the data unit D1 in step S202.

In step S203, the window control section 57 of the first communication device 50 records the maximum value of the sequence number (max_seq=8999) of the data units that have already been transmitted.

After the acknowledgment response receiving section 52 of the first communication device 50 receives the acknowledgment response A1 for the data units D1 and D2, the spurious timeout determination section 55 starts a spurious timeout determination process in step S204.

When the acknowledgment response A1 is received, the data unit transmitting section 51 immediately transmits the next data units D9 and D10. After receiving the acknowledgment response A2, the spurious timeout determination section 55 determines whether the acknowledgment response A2 is a duplicate ACK. If the acknowledgment response A2 is not a duplicate ACK as a result of the determination, in other words, if the spurious timeout determination section 55 determines that the loss is caused by the delay of the data unit, the spurious timeout determination section 55 determines that the spurious timeout has occurred. In this case, the processing proceeds to step S205.

In step S205, the window control section 57 decreases the value of the slow start threshold to half the 8K bytes (4K bytes) of the flight size (size of the data unit currently existing in the communication channel) (ssthreshold=FlightSize/2). Although the value of the slow start threshold is reduced to half the flight size, the value may be 1/n of the flight size (ssthreshold=FlightSize/n) as long as the value is smaller than the flight size (where n is a positive number).

Subsequently, in step S206, the window control section 57 sets the congestion window size (cwnd) to the value of the slow start threshold updated earlier (4K bytes).

After the acknowledgment response receiving section 52 of the first communication device 50 receives the acknowledgment response A4 in step S207, the window control section 57 determines in step S208 whether the ACK number of the received acknowledgment response A4 is equal to or smaller than the maximum sequence number max_seq recorded in step S203. The ACK number of the acknowledgment response A4 at this point is 7000, and the maximum sequence number, max_seq=8999.

As a result of the determination in step S208, if the ACK number of the acknowledgment response A4 is equal to or smaller than the maximum sequence number max_seq, the second loss determination section 54 determines whether the acknowledgment response A4 is a duplicate ACK in step S209. The second loss determination section 54 determines that the acknowledgment response A4 is a duplicate ACK because the data unit D7 is lost.

In step S210, the loss of data unit is determined. Since there is one duplicate ACK that has consecutively been received, it is determined that the data unit is not lost.

In step S211, the window control section 57 determines whether the transmission of unsent data is possible. Since the first communication device 50 holds data to be additionally transmitted, the window control section 57 determines in step S211 that the transmission is possible.

In step S212, the window control section 57 determines whether there is a limit in an advertisement window. In this case, the size of the advertisement window advertized by the second communication device 30 does not limit the size of the data unit that the first communication device 50 attempts to transmit. Therefore, the window control section 57 determines in step S212 that there is no limit in the advertisement window.

In step S213, the window control section 57 of the first communication device 50 determines whether the flight size (FlightSize) is equal to or smaller than the size of the congestion window plus two data units (cwnd+2).

More specifically, the first communication device 50 determines whether the transmission of unsent data units by the Limited Transmit is possible. The first communication device 50 transmits the unsent data unit D11 to the second communication device 30, because the transmission of unsent data is possible. There is no limitation by the advertisement window, so the size of the data unit in which the reception has not been acknowledged (4000 bytes) is equal to or smaller than the value (6000 bytes) of the current congestion window size (4000 bytes) plus the size of two data units (2000 bytes).

Similarly, in steps S207 to S213, after receiving the next acknowledgment response A5, the first communication device 50 compares the ACK number with the maximum sequence number max_seq, and then determines whether there is a duplicate ACK. If the result indicates that the ACK number is equal to or smaller than the maximum sequence number max_seq and indicates a duplicate ACK, the first communication device 50 determines whether there is a loss of a data unit. When the result of the loss determination is No, the transmission of unsent data is possible (step S211: Yes), there is no limit in the advertisement window (step S212: Yes), and the flight size (FlightSize) is equal to or smaller than the size of the congestion window plus two data units (cwnd+2), the first communication device 50 transmits the data unit D12 that is next in the order in step S214.

After receiving the next acknowledgment response A6 in step S207, the first communication device 50 compares the ACK number (7000) with the maximum sequence number max_seq (8999). Since the ACK number is smaller than the maximum sequence number max_seq, the first communication device 50 determines whether it is a duplicate ACK. Since the data unit D7 is lost, the first communication device 50 determines that the acknowledgment response A6 is a duplicate ACK and then determines whether there is a loss of a data unit. There are three duplicate ACKs A4 to A6 that have consecutively been received, so the result of the loss determination is affirmative.

Consequently, in step S216, the window control section 57 of the first communication device 50 holds the slow start threshold (ssthresh). In step s217, the window control section 57 increases the congestion window size by the size corresponding to the data unit (2000 bytes) that is equal to the number of duplicate ACKs (three) used for the loss determination minus 1 (two). Subsequently, the loss recovery section 56 executes a retransmission control by the normal Retransmit/Fast Recovery.

In step S204, the spurious timeout determination section 55 determines whether the acknowledgment response A2 is a duplicate ACK. If the spurious timeout determination section 55 determines that the acknowledgment response A2 is a duplicate ACK (when the spurious timeout has not occurred), the first communication device 50 returns to the normal TCP congestion control in step S215.

If it is determined in step S208 that the ACK number of the received acknowledgment response A4 is not equal to or smaller than the maximum sequence number max_seq recorded in step S203, the first communication device 50 ends the processing of the entire flow.

If it is determined in step S209 that the received acknowledgment response A4 is not a duplicate ACK, or if it is determined in step S211 that the transmission of unsent data is not possible, the processing returns to step S207.

Similarly, if it is determined in step S212 that there is a limit in the advertisement window, if it is determined in step S213 that the size of the flight size (FlightSize) is greater than the congestion window size plus the size of two data units (cwnd+2), or after step S214, the processing returns to step S207.

In this way, if the first communication device 50 continuously receives three or more duplicate ACKs, the congestion window size is set based on the number of duplicate ACKs used for the loss determination. As a result, the number of data units entering the network is controlled with certainty to the congestion window size in the subsequent loss recovery process.

In FIG. 12, the number of data units entering the network (corresponding to 4000 bytes) is controlled to the congestion window size (4000 bytes), after the reception of the acknowledgment response A6 and the increase of the congestion window in step S217, until the acknowledgment response A10 for the retransmitted data unit D7 is received.

Fourth Embodiment

Next, a fourth embodiment of the present invention will be described.

Figure 13:
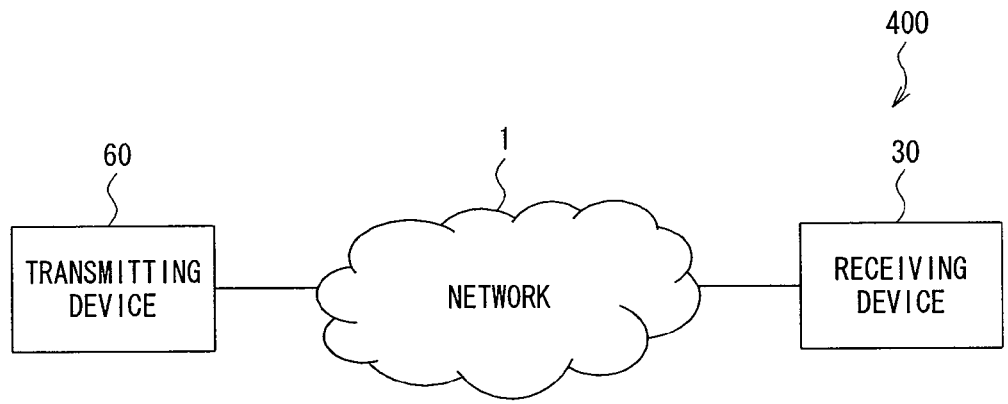
FIG. 13 illustrates a block diagram of a configuration of a communication system according to a fourth embodiment.

FIG. 13 illustrates a block diagram indicative of a configuration of a communication system according to the fourth embodiment of the present invention.

In the configuration of a communication system 400 shown in FIG. 13, a first communication device (transmitting device in this case) 60 and the second communication device (receiving device in this case) 30 are connected with each other through the wireless and/or wired network 1. Although the first communication device 60 and the second communication device 30 are connected with each other through a single network according to the present embodiment, multiple networks may exist between the devices. The present invention works in an effective manner in a network 1 in which signal delays suddenly increase. For example, the present invention works in an effective manner in a case where the network 1 is a mobile communication network. In this case, either or both of the first and second communication devices 60 and 30 corresponds to a cellular phone.

Figure 14:
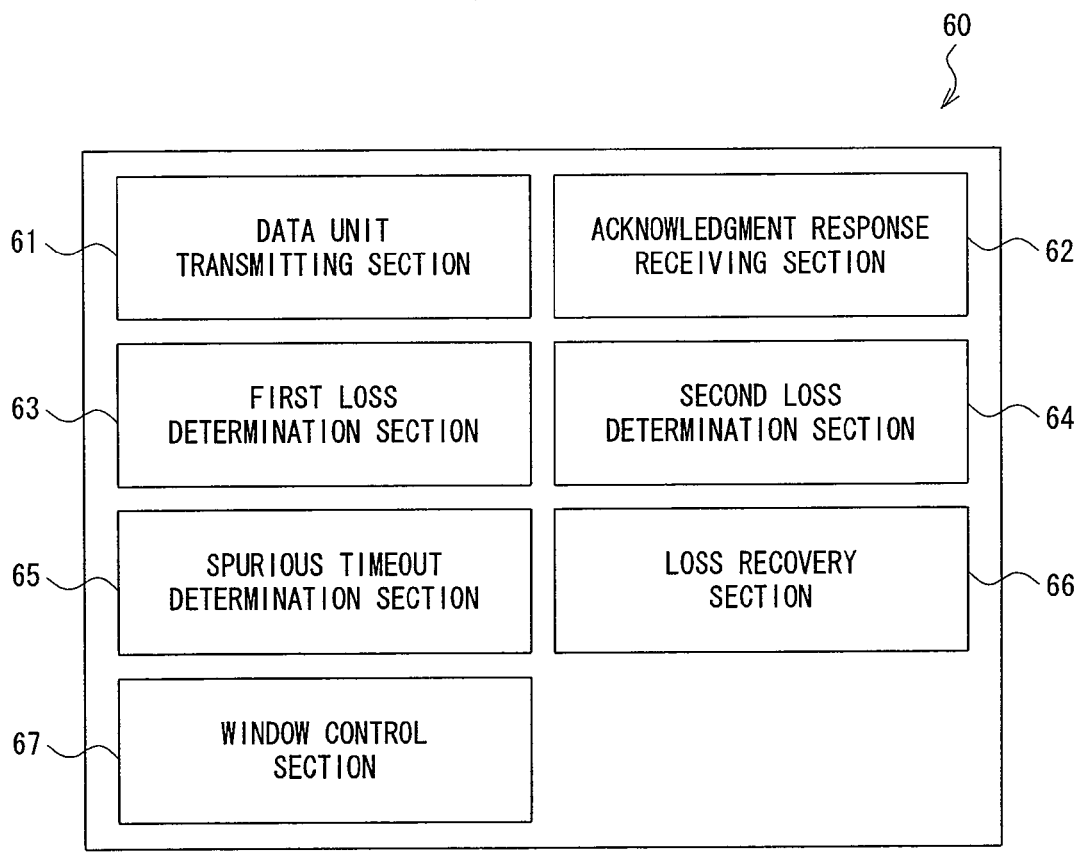
FIG. 14 illustrates a block diagram of a configuration of a first communication device 60 according to the fourth embodiment.

FIG. 14 illustrates a block diagram of a configuration of the first communication device 60 according to the present embodiment.

In FIG. 14, the first communication device 60 comprises a data unit transmitting section (transmitting means) 61, an acknowledgment response receiving section (receiving means) 62, a first loss determination section (first loss judging means) 63, a second loss determination section (second loss judging means) 64, a spurious timeout determination section (spurious timeout judging means) 65, a loss recovery section 66 (loss recovery means), and a window control section (control means) 67.

The data unit transmitting section 61 transmits a data unit that is an aggregation of one or multiple packets to the second communication device 30 through the network 1. The acknowledgment response receiving section 62 receives an acknowledgment response transmitted by the second communication device 30 through the network 1.

The first loss determination section 63 uses a timer to execute a loss determination of data unit. The timer is set when the data unit is transmitted, whereas the timer is stopped when an acknowledgment response for the data unit is received. When the timer expires, it is determined that the data unit is lost.

The second loss determination section 64 determines the loss of the data unit based on the acknowledgment response transmitted by the second communication device 30. Specifically, the second loss determination section 64 determines that the data unit with the smallest sequence number in which the reception has not been acknowledged is lost when there are three duplicate ACKs that have consecutively been received.

When the first loss determination section 63 determines that the data unit is lost, the spurious timeout determination section 65 determines whether the determination is caused by a delay of the data unit or the acknowledgment response. Specifically, when the first loss determination section 63 determines that the data unit is lost, the spurious timeout determination section 65 determines whether an acknowledgment response that is later received is a duplicate ACK. If the acknowledgment response is not a duplicate ACK, the spurious timeout determination section 65 determines that the spurious timeout has occurred.

The loss recovery section 66 executes a loss recovery process when the second loss determination section 64 determines that the data unit is lost.

The window control section 67 adjusts the window size to be described later in detail in the operational description when the determination result of the spurious timeout determination section 65 is affirmative.

Figure 15:
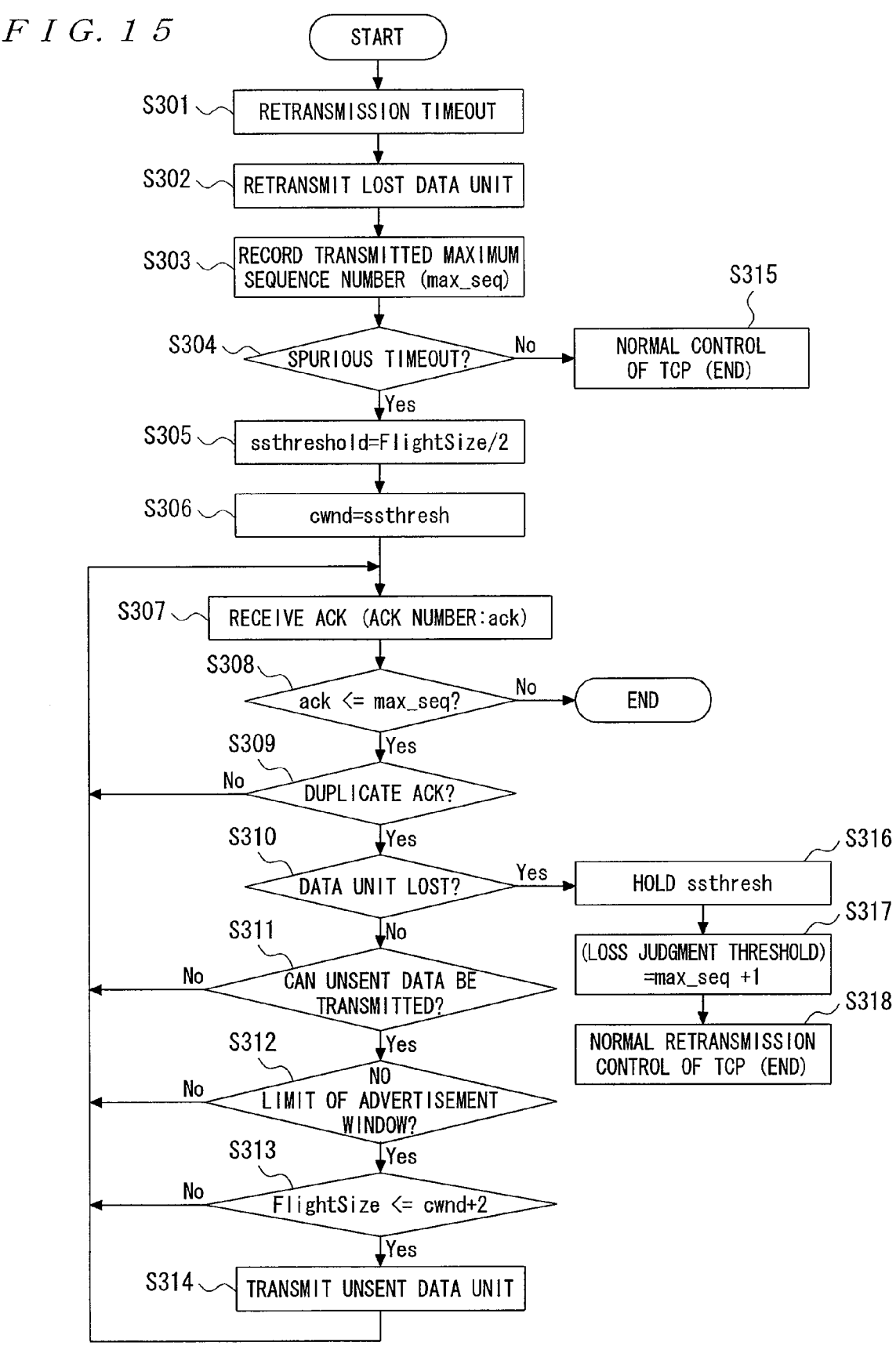
FIG. 15 illustrates a flow chart of a flow of a communication process of the first communication device 60.
Figure 16:
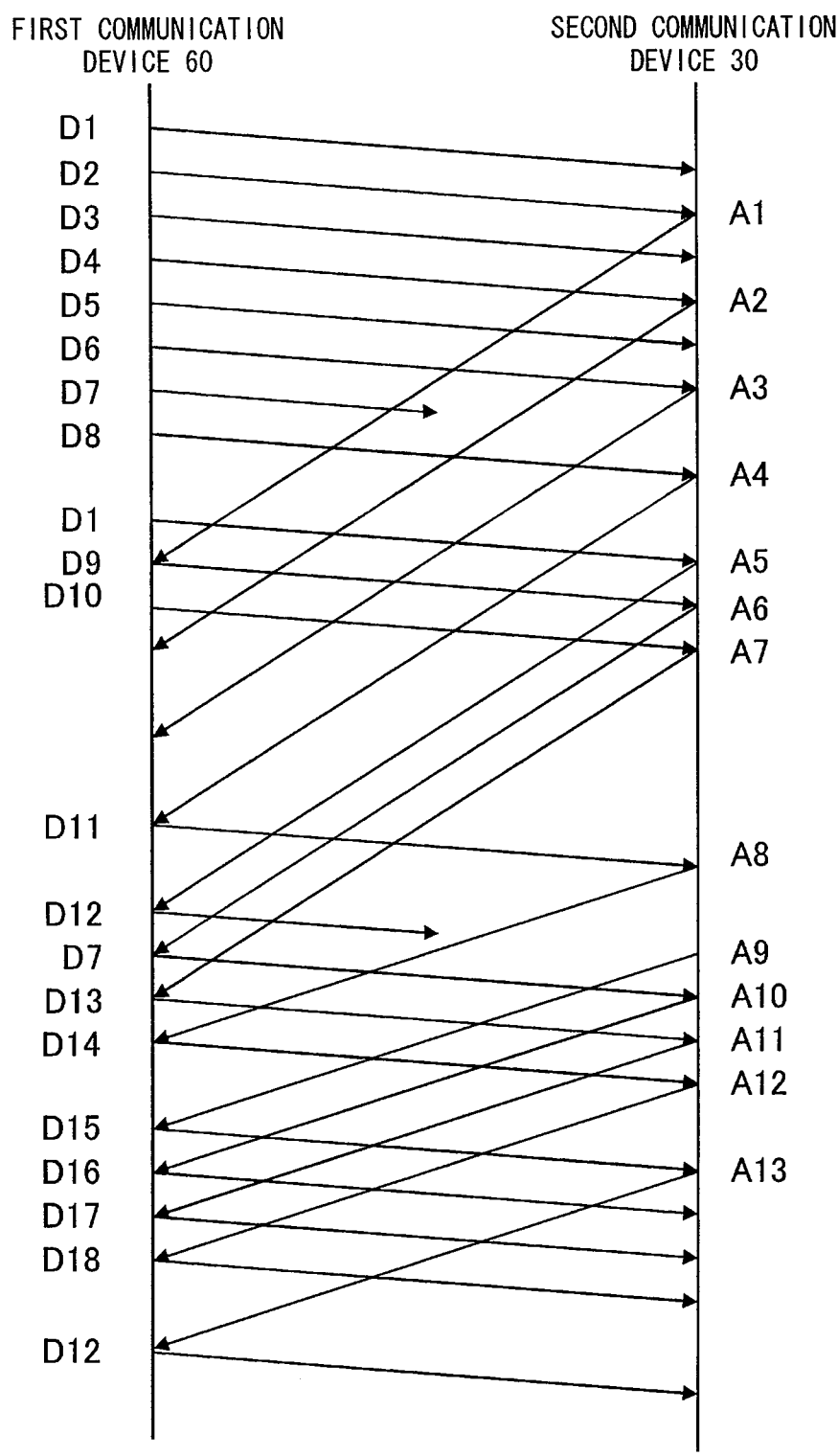
FIG. 16 illustrates a sequence diagram of an example of communication in a communication system 400.

An operation of the communication system 400 in the configuration described above will be described with reference to FIG. 15 and FIG. 16. FIG. 15 illustrates a flow chart indicative of a flow of a communication process of the first communication device 60. FIG. 16 illustrates a sequence diagram indicative of an example of communication in the communication system 400.

In this regard, the present embodiment describes that the first communication device 60 on the transmitting side and the second communication device 30 on the receiving side communicate with the TCP used for the protocol of the transport layer. FIG. 16 depicts a sequence from a state in which the TCP connection is already established between the first communication device 60 and the second communication device 30 and the size of the congestion window held by the first communication device 60 is 8K bytes. The size of the data units D1 to D18 is 1000 bytes each.

It is assumed that the data unit transmitting section 61 of the first communication device 60 has sequentially transmitted the data units D1 to D8 in 8 kilobytes in total, which are allowed by the congestion windows with sequence number 1000 (corresponding to D1) to sequence number 8000 (D8), to the second communication device 30 through the network 1.

It is further assumed that the data unit D7 with sequence number 7000 (D7) among the transmitted data units D1 to D8 is lost in the network 1 due to congestion or the like.

After receiving the data units D1 and D2, the second communication device 30 transmits the acknowledgment response A1 for the data units D1 and D2 to the first communication device 60. Similarly, the second communication device 30 transmits the acknowledgment response A2 after receiving the data units D3 and D4. The second communication device 30 transmits the acknowledgment response A3 after receiving the data units D5 and D6.

It is assumed that the acknowledgment responses A1 to A3 transmitted by the second communication device 30 have arrived at the first communication device 60 later.

If the arrival of the acknowledgment response A1 is delayed, in step S301, the timer set for the data unit D1 is timed out in the first loss determination section 63 of the first communication device 60, and the loss determination of data unit D1 is executed. In this case, since it is determined that the data unit D1 is lost, the data unit transmitting section 61 retransmits the data unit D1 in step S302.

In step S303, the window control section 67 of the first communication device 60 records the maximum value of the sequence number (max_seq=8999) of data units that have already been transmitted.

After the acknowledgment response receiving section 62 of the first communication device 60 receives the acknowledgment response A1 for the data units D1 and D2, the spurious timeout determination section 65 starts a spurious timeout determination process in step S304.

When the acknowledgment response A1 is received, the data unit transmitting section 61 immediately transmits the next data units D9 and D10. After receiving the acknowledgment response A2, the spurious timeout determination section 65 determines whether the acknowledgment response A2 is a duplicate ACK. If the acknowledgment response A2 is not a duplicate ACK as a result of the determination, in other words, if the spurious timeout determination section 65 determines that the loss is caused by the delay of the data unit, the spurious timeout determination section 65 determines that the spurious timeout has occurred. In this case, the processing proceeds to step S305.

In step S305, the window control section 67 decreases the value of the slow start threshold to half the 8K bytes (4K bytes) of the flight size immediately before the timeout (ssthreshold=FlightSize/2). Although the value of the slow start threshold is reduced to half the flight size, the value may be 1/n of the flight size (ssthreshold=FlightSize/n) as long as the value is smaller than the flight size (where n is a positive number).

Subsequently, in step S306, the window control section 67 sets the congestion window size (cwnd) to the value of the slow start threshold updated earlier (4K bytes).

After the acknowledgment response receiving section 62 of the first communication device 60 receives the acknowledgment response A4 in step S307, the window control section 67 determines in step S308 whether ACK number of the received acknowledgment response A4 is equal to or smaller than the maximum sequence number max_seq recorded in step S303. The ACK number of the acknowledgment response A4 at this point is 7000, and the maximum sequence number, max_seq=8999.

As a result of the determination in step S308, if the ACK number of the acknowledgment response A4 is equal to or smaller than the maximum sequence number max_seq, the second loss determination section 64 determines whether the acknowledgment response A4 is a duplicate ACK in step S309. The second loss determination section 64 determines that the acknowledgment response A4 is a duplicate ACK since the data unit D7 is lost.

In step S310, the loss of data unit is determined. Since there is one consecutively received duplicate ACK, it is determined that the data unit is not lost.

In step S311, the window control section 67 determines whether the transmission of unsent data is possible. Since the first communication device 60 holds data to be additionally transmitted, the window control section 67 determines in step S311 that the transmission is possible.

In step S312, the window control section 67 determines whether there is a limit in an advertisement window. In this case, the size of the advertisement window advertized by the second communication device 30 does not limit the size of the data unit that the first communication device 60 attempts to transmit. Therefore, the window control section 67 determines in step S312 that there is no limit in the advertisement window.

In step S313, the window control section 67 of the first communication device 60 determines whether the flight size (FlightSize) is equal to or smaller than the size of the congestion window plus two data units (cwnd+2).

More specifically, the first communication device 60 determines whether the transmission of unsent data units by the Limited Transmit is possible. The transmission of unsent data is possible, there is no limitation by the advertisement window, and the size of the data unit in which the reception has not been acknowledged (4000 bytes) is equal or smaller than the value (6000 bytes) of the current congestion window size (4000 bytes) plus the size of two data units (2000 bytes). Therefore, the first communication device 60 transmits the unsent data unit D11 to the second communication device 30.

Similarly, in steps S307 to S313, after receiving the next acknowledgment response A5, the first communication device 60 compares the ACK number and the maximum sequence number max_seq and determines whether it is a duplicate ACK. If the result indicates the ACK number is equal to or smaller than the maximum sequence number max_seq and indicates a duplicate ACK, the first communication device 60 determines whether there is a loss of a data unit. When the result of the loss determination is No, the transmission of unsent data is possible (step S311: Yes), there is no limit in the advertisement window (step S312: Yes), and the flight size (FlightSize) is equal to or smaller than the size of the congestion window size plus two data units (cwnd+2), the first communication device 60 transmits the data unit D12 that is next in the order in step S314. It is assumed that the data unit D12 is lost in the network 1 due to congestion or the like.

After receiving the next acknowledgment response A6 in step S307, the first communication device 60 compares the ACK number (7000) with the maximum sequence number max_seq (8999). Since the ACK number is smaller than the maximum sequence number max_seq, the first communication device 60 determines whether it is a duplicate ACK. The data unit D7 is lost, so the first communication device 60 determines that the acknowledgment response A6 is a duplicate ACK and then determines whether there is a loss of a data unit. Since there are three consecutively received duplicate ACKs A4 to A6, the result of the loss determination is affirmative (step S310: Yes).

In step S316, the window control section 67 of the first communication device 60 holds the slow start threshold (ssthresh). In step S317, the window control section 67 sets the loss determination threshold to a value of the maximum value (8999) of the sequence numbers of the data units transmitted before the timeout plus one (9000). Subsequently, the loss recovery section 66 executes a retransmission control by the normal Retransmit/Fast Recovery.

After receiving the acknowledgment response A10 for the retransmitted data unit D7, the first communication device 60 determines that the loss recovery is completed and ends the Fast Recovery, because the ACK number (12000) is equal to or greater than the value of the maximum value of the sequence numbers of the data units transmitted before the timeout plus one (9000).

Subsequently, the acknowledgment responses A11 to A13 received by the first communication device 60 are duplicate ACKs, because the data unit D12 is lost. After receiving the acknowledgment response A13 that is the third duplicate ACK, the first communication device 60 decreases the slow start threshold and the congestion window size and then executes the normal retransmission control in step S318.

In this way, when a loss of the data unit transmitted before the timeout is detected, a threshold for determining the loss recovery (loss determination threshold) is set to a value of the maximum value of the sequence numbers of the data units transmitted before the timeout plus one.

Therefore, the slow start threshold and the congestion window size can be held with respect to the loss of the data units transmitted before the timeout, and the slow start threshold and the congestion window size are decreased with respect to the loss of the data units transmitted after the timeout.

In FIG. 16, the slow start threshold and the congestion window are held with respect to the loss of the data unit D7 retransmitted before the timeout, and the slow start threshold and the congestion window size are decreased with respect to the data unit D12 transmitted after the timeout.

INDUSTRIAL APPLICABILITY

The present invention is advantageous for executing a response algorithm for changing a slow start threshold and a congestion window, if a segment loss occurs subsequent to a spurious timeout, whereby an efficient loss recovery is achieved and the throughput is improved.

The invention claimed is:

1. A communication system that transmits a data unit including one or a plurality of packet data, from a transmitting/receiving device to another transmitting/receiving device through a network,
each transmitting/receiving device comprising:
a transmitting unit for transmitting the data unit to the transmitting/receiving device on a receiving side;
a receiving unit for receiving an acknowledgment of the data unit transmitted from the transmitting/receiving device on the receiving side;
a timeout determination unit for determining that the data unit is lost if the receiving unit does not receive the acknowledgment for the data unit within a predetermined time after the transmission of the data unit;
a spurious timeout determination unit for determining whether a spurious timeout caused by a delay of the data unit is occurring, when the acknowledgment received after the determination of the timeout determination unit is not a duplicate acknowledgment;
a retransmitting unit for retransmitting the data unit when the timeout determination unit determines that the data unit is lost; and
a control unit for controlling setting of a target value to decrease a size of a congestion window that controls a number of the data units to be transmitted when the spurious timeout determination unit determines that the spurious timeout is occurring, and then performing a congestion window setting process for controlling the size of the congestion window to be gradually decreased to the target value, whenever the receiving unit receives the acknowledgment,
wherein the congestion window setting process includes, when a number of the acknowledgements received by the receiving unit, after the spurious timeout determination determines that the spurious timeout is occurring, is smaller than a maximum sequence number and the size of the congestion window is greater than the target value, subtracting a data amount of the data unit whose transmission is acknowledged from the size of the congestion window to be set to the size of the congestion window.

2. The communication system according to claim 1, wherein when the spurious timeout has occurred, the control unit sets the size of the congestion window to either the target value or a flight size, if the size of the congestion window is greater than the target value when the acknowledgements of all transmitted data units are received upon the determination of the spurious timeout.

3. A communication system that transmits a data unit including one or a plurality of packet data, from a transmitting/receiving device to another transmitting/receiving device through a network,
each transmitting/receiving device comprising:
a transmitting unit for transmitting the data unit to the transmitting/receiving device on a receiving side;
a receiving unit for receiving an acknowledgment of the data unit transmitted from the transmitting/receiving device on the receiving side;
a timeout determination unit for determining that the data unit is lost if the receiving unit does not receive the acknowledgment for the data unit within a predetermined time after the transmission of the data unit;
a spurious timeout determination unit for determining whether a spurious timeout caused by a delay of the data unit is occurring, when the acknowledgment received after the determination of the timeout determination unit is not a duplicate acknowledgment;
a duplicate acknowledgement determination unit for determining whether or not the acknowledgement received by the receiving unit is a duplicate acknowledgement to detect a loss of the data unit based on a number of the duplicate acknowledgments;
a retransmitting unit for retransmitting the data unit when the timeout determination unit determines that the data unit is lost; and
a control unit for performing a congestion window setting process for controlling the size of the congestion window to be gradually decreased to a target value, whenever the receiving unit receives the acknowledgment, and for controlling a slow start threshold not to be decreased until the acknowledgments of all transmitted data units are received at the time of the determination of the spurious timeout, even if the duplicate acknowledgement determination unit detects that the data unit is lost,
wherein the congestion window setting process includes, when a number of the acknowledgements received by the receiving unit, after the spurious timeout determination determines that the spurious timeout is occurring, is smaller than a maximum sequence number, the received acknowledgement is not a duplicate acknowledgement, and the size of the congestion window is greater than the target value, subtracting a data amount of the data unit whose transmission is acknowledged from the size of the congestion window to be set to the size of the congestion window.

4. A communication device that transmits a data unit including one or a plurality of packet data, to another communication device on a receiving side through a network, the communication device comprising:
a transmitting unit for transmitting the data unit to a transmitting/receiving device on a receiving side;
a receiving unit for receiving an acknowledgment of the data unit transmitted from the transmitting/receiving device on the receiving side;
a timeout determination unit for determining that the data unit is lost if the receiving unit does not receive the acknowledgment for the data unit within a predetermined time after the transmission of the data unit;
a spurious timeout determination unit for determining whether a spurious timeout caused by a delay of the data unit is occurring, when the acknowledgment received after the determination of the timeout determination unit is not a duplicate acknowledgment;
a retransmitting unit for retransmitting the data unit when the timeout determination unit determines that the data unit is lost; and
a control unit for controlling setting of a target value to decrease a size of a congestion window that controls a number of the data units to be transmitted when the spurious timeout determination unit determines that the spurious timeout is occurring, and then performing a congestion window setting process for controlling the size of the congestion window to be gradually decreased to the target value, whenever the receiving unit receives the acknowledgment,
wherein the congestion window setting process includes, when a number of the acknowledgements received by the receiving unit, after the spurious timeout determination determines that the spurious timeout is occurring, is smaller than a maximum sequence number and the size of the congestion window is greater than the target value, subtracting a data amount of the data unit whose transmission is acknowledged from the size of the congestion window to be set to the size of the congestion window.

5. The communication device according to claim 4, wherein when the spurious timeout has occurred, the control unit sets the size of the congestion window to either the target value or a flight size if the size of the congestion window is greater than the target value when the acknowledgments of all data units transmitted before the retransmission of the data unit by the retransmitting unit are received.

6. The communication device according to claim 4, wherein the target value is 1/n of the flight size at the time of the determination of the spurious timeout.

7. The communication device according to claim 4, wherein the target value is an amount of one data unit.

8. A communication device that transmits a data unit including one or a plurality of packet data to another communication device on a receiving side through a network,
the communication device comprising:
a transmitting unit for transmitting the data unit to a transmitting/receiving device on a receiving side;
a receiving unit for receiving an acknowledgment of the data unit transmitted from the transmitting/receiving device on the receiving side;
a timeout determination unit for determining that the data unit is lost if the receiving unit does not receive the acknowledgment for the data unit within a predetermined time after the transmission of the data unit;
a spurious timeout determination unit for determining whether a spurious timeout caused by a delay of the data unit is occurring, when the acknowledgment received after the determination of the timeout determination unit is not a duplicate acknowledgment;
a duplicate acknowledgement determination unit for determining whether or not the acknowledgement received by the receiving unit is a duplicate acknowledgement to detect a loss of the data unit based on a number of the duplicate acknowledgments;
a retransmitting unit for retransmitting the data unit when the timeout determination unit determines that the data unit is lost; and
a control unit for performing a congestion window setting process for controlling the size of the congestion window to be gradually decreased to a target value, whenever the receiving unit receives the acknowledgment, and for controlling a slow start threshold not to be decreased until the acknowledgments of all transmitted data units are received at the time of the determination of the spurious timeout, even if the duplicate acknowledgement determination unit detects that the data unit is lost,
wherein the congestion window setting process includes, when a number of the acknowledgements received by the receiving unit, after the spurious timeout determination determines that the spurious timeout is occurring, is smaller than a maximum sequence number, the received acknowledgement is not a duplicate acknowledgement, and the size of the congestion window is greater than the target value, subtracting a data amount of the data unit whose transmission is acknowledged from the size of the congestion window to be set to the size of the congestion window.

9. A communication method of transmitting a data unit including one or a plurality of packet data, from a communication device on a transmitting side to another communication device on a receiving side through a network,
the communication method by the communication device on the transmitting side, comprising the steps of:
determining that the data unit is lost when an acknowledgment for the data unit from the another communication device on the receiving side is not received within a predetermined time after the transmission of the data unit;
determining whether a spurious timeout caused by a delay of the data unit is occurring, when the acknowledgment received after the determination that the data unit is lost is not a duplicate acknowledgment;
retransmitting the data unit when the determination is made that the data unit is lost; and
setting a target value to decrease a size of the congestion window that controls a number of the data units to be transmitted when the determination is made that the spurious timeout is occurring, and then performing a congestion window setting process for gradually decreasing the size of the congestion window to the target value whenever the acknowledgment is received,
wherein the congestion window setting process includes, when a number of the acknowledgements received by the receiving unit, after the spurious timeout determination determines that the spurious timeout is occurring, is smaller than a maximum sequence number and the size of the congestion window is greater than the target value, subtracting a data amount of the data unit whose transmission is acknowledged from the size of the congestion window to be set to the size of the congestion window.

10. A communication method of transmitting a data unit including one or a plurality of packet data, from a communication device on a transmitting side to another communication device on a receiving side through a network,
the communication method by the communication device on the transmitting side, comprising the steps of:
determining that the data unit is lost when an acknowledgment for the data unit from the another communication device on the receiving side is not received within a predetermined time after the transmission of the data unit;
determining whether a spurious timeout caused by a delay of the data unit is occurring, when the acknowledgment received after the determination that the data unit is lost is not a duplicate acknowledgment;
determining whether or not the acknowledgement received is a duplicate acknowledgement to detect a loss of the data unit based on a number of the duplicate acknowledgments;
retransmitting the data unit when the determination is made that the data unit is lost; and
performing a congestion window setting process for controlling the size of the congestion window to be gradually decreased to a target value, whenever the acknowledgment is received, and for controlling a slow start threshold not to be decreased until the acknowledgments of all transmitted data units are received at the time of the determination of the spurious timeout, even if the duplicate acknowledgement determination unit detects that the data unit is lost,
wherein the congestion window setting process includes, when a number of the acknowledgements received by the receiving unit, after the spurious timeout determination determines that the spurious timeout is occurring, is smaller than a maximum sequence number, the received acknowledgement is not a duplicate acknowledgement, and the size of the congestion window is greater than the target value, subtracting a data amount of the data unit whose transmission is acknowledged from the size of the congestion window to be set to the size of the congestion window.

11. A communication system including a communication device that transmits and receives a data unit through a network,
the communication device comprising:
a data unit transmitting unit for transmitting the data unit to another communication device on a receiving side;
a receiving unit for receiving an acknowledgment transmitted by the another communication device on the receiving side;
a duplicate response determination unit for determining whether an acknowledgment received by the receiving unit is a duplicate acknowledgment;
a timeout determination unit for determining a loss of the data unit using a timer;
a spurious timeout determination unit for determining whether a spurious timeout caused by a delay of the data unit is occurring, when the timeout determination unit determines the loss of the data unit and when the duplicate response determination unit determines the acknowledgement received by the receiving unit is not a duplicate acknowledgement; and
a window control unit for controlling a number of the data units to be transmitted using a congestion window, when the spurious timeout determination unit determines the spurious timeout is occurring,
wherein the duplicate response determination unit determines the loss of the data unit, when three duplicate acknowledgements are consecutively received, and
wherein when the spurious timeout determination unit determines that the spurious timeout is occurring, the acknowledgement received by the receiving unit after the determination of the spurious timeout acknowledges a reception of a part of the data units transmitted before the data unit is retransmitted based on the determination of the timeout determination unit, the duplicate response determination unit determines that the acknowledgment is a duplicate acknowledgment, but the data unit is not lost, and there is no limitation in a size of an advertisement window to be advertised from the another communication device on the receiving side, the window control unit allows transmission of the data units that have not been transmitted up to a predetermined number.

12. A communication device that transmits a data unit through a network, the communication device comprising:
a data unit transmitting unit for transmitting the data unit to another communication device on a receiving side;
a receiving unit for receiving an acknowledgment transmitted by the another communication device on the receiving side;
a duplicate response determination unit for determining whether an acknowledgment received by the receiving unit is a duplicate acknowledgment;
a timeout determination unit for determining a loss of the data unit using a timer;
a spurious timeout determination unit for determining whether a spurious timeout caused by a delay of the data unit is occurring, when the timeout determination unit determines the loss of the data unit and when the duplicate response determination unit determines the acknowledgement received by the receiving unit is not a duplicate acknowledgement; and
a window control unit for controlling a number of the data units to be transmitted using a congestion window, when the spurious timeout determination unit determines the spurious timeout is occurring,
wherein the duplicate response determination unit determines the loss of the data unit, when three duplicate acknowledgements are consecutively received, and
wherein when the spurious timeout determination unit determines that the spurious timeout is occurring, the acknowledgement received by the receiving unit after the determination of the spurious timeout acknowledges a reception of a part of the data units transmitted before the data unit is retransmitted based on the determination of the timeout determination unit, the duplicate response determination unit determines that the acknowledgment is a duplicate acknowledgment, but the data unit is not lost, and there is no limitation in a size of an advertisement window to be advertised from the another communication device on the receiving side, the window control unit allows transmission of the data units that have not been transmitted up to a predetermined number.

13. A communication method in a communication system including a communication device that transmits and receives a data unit through a network,
the communication method by the communication device on a transmitting side, comprising the steps of:
transmitting the data unit to another communication device on a receiving side;
receiving an acknowledgment transmitted by the another communication device on the receiving side;
determining whether an acknowledgment received in the receiving is a duplicate acknowledgment;
determining a loss of the data unit using a timer;
determining whether a spurious timeout is occurring, when the loss of the data unit is determined and when the determination is made that the acknowledgement received is not a duplicate acknowledgement; and
controlling a number of the data units to be transmitted using a congestion window, when the spurious timeout is occurring,
wherein the loss of the data unit is determined, when three duplicate acknowledgements are consecutively received, and
wherein when the determination is made that the spurious timeout is occurring, the acknowledgement received after the determination of the spurious timeout acknowledges a reception of a part of the data units transmitted before the data unit is retransmitted, the determination is made that the acknowledgment is a duplicate acknowledgment but the data unit is not lost, and there is no limitation in a size of an advertisement window to be advertised from the another communication device on the receiving side, transmission of the data units that have not been transmitted is allowed up to a predetermined number.

14. A communication system including a communication device that transmits and receives a data unit through a network,
the communication device comprising:
a data unit transmitting unit for transmitting the data unit to another communication device on a receiving side;
a receiving unit for receiving an acknowledgment transmitted by the another communication device on the receiving side;
a timeout determination unit for determining a loss of the data unit using a timer;
a spurious timeout determination unit for determining whether a spurious timeout caused by a delay of the data unit is occurring, when the timeout determination unit determines the loss of the data unit and when a duplicate response determination unit determines the acknowledgement received by the receiving unit is not a duplicate acknowledgement; and
a window control unit for controlling a number of the data units to be transmitted using a congestion window, when the spurious timeout determination unit determines the spurious timeout is occurring,
wherein when the spurious timeout determination unit determines that the spurious timeout is occurring, the window control unit does not change a size of the congestion window, even after the receiving unit receives the acknowledgment and after the spurious timeout determination unit determines that the spurious timeout is occurring, until receptions of all of the data units transmitted before the data unit is retransmitted based on the determination of the timeout determination unit are acknowledged.

15. A communication device that transmits a data unit through a network, the communication device comprising:
a data unit transmitting unit for transmitting the data unit to another communication device on a receiving side;
a receiving unit for receiving an acknowledgment transmitted by the another communication device on the receiving side;
a timeout determination unit for determining a loss of the data unit using a timer;
a spurious timeout determination unit for determining whether a spurious timeout caused by a delay of the data unit is occurring, when the timeout determination unit determines the loss of the data unit and when a duplicate response determination unit determines the acknowledgement received by the receiving unit is not a duplicate acknowledgement; and
a window control unit for controlling a number of the data units to be transmitted using a congestion window, when the spurious timeout determination unit determines the spurious timeout is occurring,
wherein when the spurious timeout determination unit determines that the spurious timeout is occurring, the window control unit does not change a size of the congestion window, even after the receiving unit receives the acknowledgment and after the spurious timeout determination unit determines that the spurious timeout is occurring, until receptions of all of the data units transmitted before the data unit is retransmitted based on the determination of the timeout determination unit are acknowledged.

16. A communication method in a communication system including a communication device that transmits and receives a data unit through a network,
the communication method by the communication device on a transmitting side, comprising:
transmitting the data unit to another communication device on a receiving side;
receiving an acknowledgment transmitted by the another communication device on the receiving side;
determining a loss of the data unit using a timer;
determining whether a spurious timeout caused by a delay of the data unit is occurring, when the loss of the data unit is determined and when the determination is made that the acknowledgement received is not a duplicate acknowledgement; and
controlling a number of the data units to be transmitted using a congestion window, when the determination is made that the spurious timeout is occurring,
wherein when the determination is made that the spurious timeout is occurring, a size of the congestion window is not changed until receptions of all of the data units transmitted before the data unit is retransmitted based on the determination of the timeout are acknowledged.

17. A communication system including a communication device that transmits and receives a data unit through a network,
the communication device comprising:
a data unit transmitting unit for transmitting the data unit to another communication device on a receiving side;
a receiving unit for receiving an acknowledgment transmitted by the another communication device on the receiving side;
a timeout determination unit for determining a loss of the data unit using a timer;
a spurious timeout determination unit for determining whether a spurious timeout caused by a delay of the data unit is occurring, when the acknowledgement received after the determination of the timeout determination unit is not a duplicate acknowledgement;
a duplicate response determination unit for determining the loss of the data unit based on the acknowledgment from the another communication device on the receiving side;
a loss recovery unit for recovering the loss of the data unit when the duplicate response determination unit determines that the data unit is lost; and
a window control unit for controlling the number of the data units to be transmitted using a congestion window,
wherein the duplicate response determination unit determines that the data unit having a smallest sequence number whose reception is not acknowledged is lost, when the receiving unit receives three duplicate acknowledgements consecutively, and
wherein when the spurious timeout determination unit determines that the spurious timeout is occurring, the data unit determined to be lost by the duplicate response determination unit after the spurious timeout determination unit determines that the spurious timeout is occurring is the data unit transmitted before retransmission based upon the determination of the timeout determination unit, and when the duplicate response determination unit determines that the data unit is lost, the window control unit does not change a slow start threshold, and increases a size of the congestion window according to a number of the duplicate acknowledgements used for the determination of the loss of the data unit by the duplicate response determination unit.

18. The communication system according to claim 17, wherein the window control unit increases the size of the congestion window by a size corresponding to the number of data units that is obtained by subtracting one from the number of duplicate acknowledgments, used for the determination of the loss of the data unit by the duplicate response determination unit.

19. A communication device that transmits a data unit through a network, the communication device comprising:
a data unit transmitting unit for transmitting the data unit to another communication device on a receiving side;
a receiving unit for receiving an acknowledgment transmitted by the another communication device on the receiving side;
a timeout determination unit for determining a loss of the data unit using a timer;
a spurious timeout determination unit for determining whether a spurious timeout caused by a delay of the data unit is occurring, when the acknowledgement received after the determination of the timeout determination unit is not a duplicate acknowledgement;

a duplicate response determination unit for determining the loss of the data unit based on the acknowledgment from the another communication device on the receiving side;

a loss recovery unit for recovering the loss of the data unit when the duplicate response determination unit determines that the data unit is lost; and a window control unit for controlling the number of the data units to be transmitted using a congestion window, wherein the duplicate response determination unit determines that the data unit having a smallest sequence number whose reception is not acknowledged is lost, when the receiving unit receives three duplicate acknowledgements consecutively, and wherein when the spurious timeout determination unit determines that the spurious timeout is occurring, the data unit determined to be lost by the duplicate response determination unit after the spurious timeout determination unit determines that the spurious timeout is occurring is the data unit transmitted before retransmission based upon the determination of the timeout determination unit, and when the duplicate response determination unit determines that the data unit is lost, the window control unit does not change a slow start threshold, and increases a size of the congestion window according to a number of the duplicate acknowledgements used by the determination of the loss of the data unit by the duplicate response determination unit.

20. A communication method in a communication system including a communication device that transmits and receives a data unit through a network, the communication device comprising:

of transmitting the data unit to another communication device on a receiving side;

receiving an acknowledgment transmitted by the another communication device on the receiving side;

determining a loss of the data unit using a timer;

determining whether a spurious timeout caused by a delay of the data unit is occurring, when the acknowledgement received is not a duplicate acknowledgement;

determining the loss of the data unit based on the acknowledgment from the another communication device on the receiving side;

recovering the loss of the data unit when the determination is made that the data unit is lost; and controlling the number of the data units to be transmitted using a congestion window, wherein the determination is made that the data unit having a smallest sequence number whose reception is not acknowledged is lost, when three duplicate acknowledgements are received consecutively, and wherein when the determination is made that the spurious timeout is occurring, the data unit determined to be lost after the determination is made that the spurious timeout is occurring is the data unit transmitted before retransmission based upon the determination of the timeout, and when the determination is made that the data unit is lost, a slow start threshold is not changed, and a size of the congestion window is increased according to a number of the duplicate acknowledgements used by the determination of the loss of the data unit.

21. A communication system including a communication device that transmits and receives a data unit through a network, the communication by comprising:

a data unit transmitting unit for transmitting the data unit to another communication device on a receiving side;

a receiving unit for receiving an acknowledgment transmitted by the another communication device on the receiving side;

a timeout determination unit for determining a loss of the data unit using a timer;

a spurious timeout determination unit for determining whether a spurious timeout caused by a delay of the data unit is occurring, when the acknowledgement received after the determination of the timeout determination unit is not a duplicate acknowledgement;

a duplicate response determination unit for determining the loss of the data unit based on the acknowledgment from the another communication device on the receiving side;

a loss recovery unit for recovering the loss of the data unit when the duplicate response determination unit determines that the data unit is lost; and a window control unit for controlling the number of the data units to be transmitted using a congestion window, wherein the duplicate response determination unit determines that the data unit having a smallest sequence number whose reception is not acknowledged is lost, when the receiving unit receives three duplicate acknowledgements consecutively, wherein the loss recovery unit holds a threshold for determining the completion of the loss recovery according to a value of the acknowledgment received by the receiving unit, and wherein when the spurious timeout determination unit determines that the spurious timeout is occurring, the duplicate response determination unit determines that the data unit transmitted before retransmission is lost based upon the determination by the duplicate response determination unit after the spurious timeout determination unit determines that the spurious timeout is occurring, and when the duplicate response determination unit determines that the data unit is lost, the window control unit does not change a slow start threshold and sets the threshold for determining the completion of the loss recovery to a value corresponding to a maximum sequence number of the data unit that has been transmitted by the time of the retransmission based on the determination of the timeout determination unit.

22. A communication device that transmits a data unit through a network, the communication device comprising:

a data unit transmitting unit for transmitting the data unit to another communication device on a receiving side;

a receiving unit for receiving an acknowledgment response transmitted by the another communication device on the receiving side;

a timeout determination unit for determining a loss of the data unit using a timer;

a spurious timeout determination unit for determining whether a spurious timeout caused by a delay of the data unit is occurring, when the acknowledgement received after the determination of the timeout determination unit is not a duplicate acknowledgement;

a duplicate response determination unit for determining the loss of the data unit based on the acknowledgment from the another communication device on the receiving side;

a loss recovery unit for recovering the loss of the data unit when the duplicate response determination unit determines that the data unit is lost; and a window control unit for controlling the number of the data units to be transmitted using a congestion window, wherein the duplicate response determination unit determines that the data unit having a smallest sequence number whose reception is not acknowledged is lost, when the receiving unit receives three duplicate acknowledgements consecutively, wherein the loss recovery unit holds a threshold for determining completion of the loss recovery according to a value of the acknowledgment received by the receiving unit, and wherein when the spurious timeout determination unit determines that the spurious timeout is occurring, the duplicate response determination unit determines that the data unit transmitted before retransmission is lost based upon the determination by the duplicate response determination unit after the spurious timeout determination unit determines that the spurious timeout is occurring, and the duplicate response determination unit determines that the data unit is lost, the window control unit does not change a slow start threshold and sets the threshold for determining the completion of the loss recovery to a value corresponding to a maximum sequence number of the data unit that has been transmitted by the time of the retransmission based on the determination of the timeout determination unit.

23. A communication method in a communication system including a communication device that transmits and receives a data unit through a network, the communication method by the communication device, comprising the steps of:

transmitting the data unit to another communication device on a receiving side;

receiving an acknowledgment transmitted by the another communication device on the receiving side;

determining a loss of the data unit using a timer;

determining whether a spurious timeout caused by a delay of the data unit is occurring;

determining the loss of the data unit based on the acknowledgment from the another communication device on the receiving side;

recovering the loss of the data unit when the determination is made that the data unit is lost; and controlling the number of the data units to be transmitted using a congestion window, wherein the determination is made that the data unit having a smallest sequence number whose reception is not acknowledged is lost, when three duplicate acknowledgements are received consecutively, wherein a threshold for determining completion of the loss recovery is held according to a value of the acknowledgment received, and wherein when the determination is made that the spurious timeout is occurring, that the data unit transmitted before retransmission is lost after the determination is made that the spurious timeout is occurring, and that the data unit is lost, a slow start threshold is not changed and the threshold for determining the completion of the loss recovery is set to a value corresponding to a maximum sequence number of the data unit that has been transmitted by the time of the retransmission based on the determination of the timeout.

* * * * *